United States Patent [19]
Kawano et al.

[11] Patent Number: 5,129,017
[45] Date of Patent: Jul. 7, 1992

[54] ELECTRICALLY CONTROLLED OPTICAL DEVICE

[75] Inventors: Kenji Kawano, Atsugi; Toshinori Nozawa, Kunitachi; Hiromichi Jumonji, Tama; Tsutomu Kitou, Mito; Osamu Mitomi, Isehara; Toshio Suzuki, Tokyo; Kazuto Noguchi, Isehara, all of Japan

[73] Assignee: Nippon Telegraph and Telephone Company, Tokyo, Japan

[21] Appl. No.: 480,057

[22] Filed: Feb. 14, 1990

[30] Foreign Application Priority Data

Feb. 17, 1989 [JP] Japan .................. 1-39162

[51] Int. Cl.$^5$ .................. G02B 6/10; G02F 1/01
[52] U.S. Cl. .................. 385/3; 385/2
[58] Field of Search ........... 350/96.12, 96.13, 96.14; 385/1-3, 4, 8, 9

[56] References Cited

U.S. PATENT DOCUMENTS

| | | | |
|---|---|---|---|
| 4,709,978 | 12/1987 | Jackel | 350/96.14 |
| 4,850,667 | 7/1989 | Djupsjöbacka | 350/96.14 |
| 4,866,406 | 9/1989 | Minakata et al. | 350/96.13 X |

FOREIGN PATENT DOCUMENTS

| | | |
|---|---|---|
| 233797 | 8/1987 | European Pat. Off. |
| 48021 | 2/1989 | Japan |
| 91111 | 4/1989 | Japan |
| 204020 | 8/1989 | Japan |
| 51123 | of 1990 | Japan |

OTHER PUBLICATIONS

Kawano et al., "New Travelling-Wave Electrode Mach-Zehnder Optical Modulator with 20 GHz Bandwidth and 4.7v Driving Voltage at 1.52 μm Wavelength," Electronic Letters (Sep. 28, 1989), pp. 1382-1383.
K. Lizuka, "Engineering Optics" (1983), pp. 416-417 and p. 455.
Izutsu et al., "Broad-Band Guided-Wave Light Intensity Modulator," Journal of Institute of Electronics and Communication Engineers of Japan, (C) J64-C, 4 (1981), pp. 264-271.
K. Kawano, "Hybrid-Mode Analysis of a Broadside-Coupled Microstrip Line," IEE Proc. Pt. H, vol. 131 (1984), pp. 21-24.
Sanagi et al., "Quasi-Matched-Velocity Traveling-Wave Type Electrodes for Light Modulators and Its Analysis," Journal of Institute of Electronics and Communication Engineers of Japan, vol. J69-C (1986), pp. 1291-1296.
Applied Physics Letter, vol. 45, No. 11, Dec. 1, 1984 Becker "Traveling-Wave Electro-Optic Modulator with Maximum Bandwith-Length Product", pp. 1168-1170.
"Picosecond Electronics and Optoelectronics", Proceedings of the Topical Meeting, Lake Tahoe, Nevada, Mar. 13-15, 1985 Ed-Mourou et al. pp. 172-175.
"12 GH$_z$-Bandwidth Ti:LiNbO$_3$ Mach Zehnder Modulator" Seino et al., Second Optoelectronics Conf. Oct. 1988, Tokyo "Optical Subpicosecond Gate" Marcatile, Applied Optics vol. 19, No. 9, May 1st 1980, pp. 1468-1476.

*Primary Examiner*—John D. Lee
*Assistant Examiner*—John Ngo
*Attorney, Agent, or Firm*—Spencer, Frank & Schneider

[57] ABSTRACT

An electrically controlled optical device includes a traveling wave electrode structure, a shield conductor and a thick buffer layer having a low dielectric constant. The thickness of an overlaid layer disposed between the traveling wave electrode structure and the shield conductor, as well as the thickness of the buffer layer, is determined so that the effective index of a microwave transmitted through the traveling wave electrode structure approaches the effective index of light transmitted through an optical waveguide, so that the microwave conductor loss is reduced, and so that the characteristic impedance of the traveling wave electrode structure approaches the characteristic impedance of an associated external microwave circuit.

25 Claims, 34 Drawing Sheets

ELECTRICALLY CONTROLLED OPTICAL DEVICE

BACKGROUND OF THE INVENTION

1. Field of the Invention

The present invention relates to electrically controlled optical devices with a high operating speed, such as a light intensity modulator, a light phase modulator, or an optical switch, and also to a method of producing such electrically controlled optical devices.

2. Description of the Prior Art

For a better understanding of conventional electrically controlled optical devices, one example of a conventional Mach-Zehnder light intensity (optical) modulator is shown in FIGS. 1A and 1B, which are a plan view thereof and a cross-sectional view taken along the line A—A', respectively. In this example, Mach-Zehnder optical waveguides 2 are formed by Ti thermal diffusion in a Z-cut substrate 1 of $LiNbO_3$ having electro-optic effects. A buffer layer 3 of $SiO_2$ having a thickness D (usually, D is 2000 to 3000 Å) is formed on the substrate 1, and a coplanar waveguide (CPW) composed of a center electrode 4 and earth or ground electrodes 5 is formed on the buffer layer 3. Each termination resistor 6 is connected between the CPW electrodes 4 and 5. A feeder 7 is connected to the electrodes 4 and 5 to supply a modulating microwave signal thereto.

The electrode 4 and the electrodes 5 are generally called "CPW electrodes", and are constituted as traveling wave electrodes. With respect to the dimensions of these electrodes, the thickness of the electrodes 4 and 5 is usually 1 to 3 µm, the width 2W of the center electrode 4 is 35 µm, and the gaps 2G between the center electrode 4 and the earth electrodes 5 are 6 µm. Since the characteristic impedance of the CPW electrodes is 21 Ω, 42 Ω is selected as the value of the termination resistors 6.

Generally, in an optical modulator, when driving electric power is supplied from the modulating microwave signal feeder 7, an electric field is applied between the center electrode 4 and the earth electrodes 5. Since the $LiNbO_3$ substrate 1 has electro-optic effects, a change in the refractive index occurs due to this electric field. As a result, the light beams propagated respectively through the two optical waveguides 2 are shifted in phase from each other. When this phase shift reaches the level of $\pi$, the light radiates in to the substrate at a light-mixing portion of the Mach-Zehnder optical waveguide, so that an OFF condition develops. In this optical modulator, since the CPW electrodes 4 and 5 are constituted as traveling wave electrodes, such a limitation as is encountered in an electrical circuit is ideally not imposed on the bandwidth. Furthermore, insofar as the modulating microwave signal wave propagated through the CPW electrodes 4 and 5 agrees in propagating velocity with the light propagated through the optical waveguide 2, the modulation bandwidth is not limited, and therefore the optical modulator can operate at high speed.

Actually, however, there is a difference between the velocity of the microwave and the velocity of the light, and th modulation bandwidth is limited by it. A 3 dB modulation bandwidth Δf resulting from this velocity mismatch is expressed by the following formula (Reference literature: Journal of Institute of Electronics and Communication Engineers of Japan, (C), J64-C, 4, p. 264-271, 1981):

$$\Delta f = 1.9 c/(\pi L \ |n_m - n_o|) \quad (1)$$

where $n_m$ represents the microwave effective index of the substrate 1 with respect to the signal wave, $n_o$ represents the effective index encountered by the light, L represents the length of the portion of the CPW electrode 4, 5 interacting with the optical waveguide 2, and c represents the light velocity.

Here, the modulation bandwidth Δf represents the 3 dB modulation bandwidth in optical power. In the above reference literature, the 3 dB modulation bandwidth is indicated in terms of the electric level when the above optical power is converted by a light-receiving device. Therefore, the factor "1.9" in the formula (1) is obtained through conversion of a factor "1.4" of the above reference literature.

The relation of the above microwave effective index $n_m$ with an effective dielectric constant $\epsilon_{eff}$ (effective relative permittivity) of the substrate 1 is expressed in the following:

$$n_m = \sqrt{\epsilon_{eff}} \quad (2)$$

In a substrate material having electro-optic effects, the microwave effective index $n_m$ with respect to a signal wave is usually greater than the effective index $n_o$ with respect to light. The effective dielectric constant $\epsilon_{eff}$ of the substrate 1 is determined mainly by the dielectric constant $\epsilon_{r2}$ and the thickness of the substrate material, the gap 2G between the CPW electrodes 4 and 5, the operating frequency, etc. To permit the substrate to be easily handled when producing it, the thickness of the substrate is usually 0.5 mm to several millimeters. Since the thickness of the substrate is usually sufficiently greater than the electrode gap 2G, the following formula is established:

$$\epsilon_{eff} \approx (\epsilon_{r2} + 1)/2 \quad (3)$$

The dielectric constant of the $LiNbO_3$ substrate is nearly equal to 35 (i.e., $\epsilon_{r2} \approx 35$), and from the formulas (2) and (3), the microwave effective index $n_m$ is nearly equal to 4.2 (i.e., $n_m \approx 4.2$). Since the effective index $n_o$ with respect to light is 2.1 (i.e., $n_o = 2.1$), the microwave effective index $n_m$ is about twice the effective index $n_o$.

Therefore, when operation of the device is to be effected at 9 GHz, around 10 mm is selected, from the formula (1), as the length L of the portion of the CPW electrodes 4 and 5 interacting with the optical waveguide.

In order that the conventional optical modulator shown in FIGS. 1A and 1B can operate at high speed, it will be appreciated from the formula (1) that the length L of the CPW electrodes 4 and 5 should be shortened in accordance with the operating frequency. However, when the electrode length L is shortened, the driving voltage of the optical modulator becomes higher, which results in the disadvantage that the modulation efficiency is lowered.

FIGS. 2A and 2B show an optical modulator disclosed by some of the present inventors and others in an earlier Japanese Patent Application, Laying-Open No. 48,021/89. In this optical modulator, a shield conductor 9 is provided on electrodes 4 and 5 through an overlaid layer 8. The overlaid layer 8 is made of polyimide or air. By reducing the thickness H of the overlaid layer 8 (that is, bringing the shield conductor 9 closer to the electrodes 4 and 5), the microwave effective index $n_m$ can be decreased, thereby decreasing the velocity mismatch between the microwave and the light.

However, in this optical modulator of the above earlier application, the effect of decreasing the microwave effective index $n_m$ by the buffer layer 3 is not efficiently utilized. Therefore, if it is intended to sufficiently match the velocity of the microwave to that of the light, the characteristic impedance of the CPW electrodes 4 and 5 decreases too much, as compared with the case where the shield conductor 9 is not used. As a result, the CPW electrodes 4 and 5 can not match an external microwave circuit. Moreover, if in view of this impedance decrease due to the shield conductor 9, the gap width 2G is increased (that is, the characteristic impedance is set to a high value), the intensity of the electric field acting on the optical waveguide 2 is weakened, so that the driving voltage is increased. Further, since the shield conductor 9 is disposed close to the CPW electrodes 4 and 5, the microwave conductor loss becomes large as will be later described.

FIGS. 3A and 3B show an optical modulator disclosed by some of the present inventors and others in an earlier Japanese Patent Application, No. 201491/88. In this optical modulator, the width 2W of the center electrode 4 is approximately equal to that of the optical waveguide 2, and the buffer layer 3 of $SiO_2$ has an increased thickness D, thereby improving the characteristics.

The characteristics of this earlier example are shown in FIG. 4. FIG. 4 shows the results of analysis of the relation of the microwave effective index $n_m$ and the characteristic impedance $Z_o$ with the thickness D of the buffer layer 3 when the width 2W of the central conductor portion 4 of the CPW is 8 μm, and the gap width 2G is 15 μm. In this analysis, the evaluation is made using the spectral domain method (Kawano: "Hybridmode analysis of a broadside-coupled microstrip line", IEE Proc. Pt. H, vol.131, pp.21-24, 1984), which can strictly deal with a dielectric multi-layer structure.

As can be seen from FIG. 4, with an increase of the thickness of the buffer layer 3, the microwave effective index $n_m$ decreases, and hence $|n_m - n_o|$ decreases. As a result, the product of the 3 dB modulation band and interaction length (Δf·L) can be increased, as shown in FIG. 5.

In FIG. 5, the ordinate axis represents the product (Δf·L) of the 3 dB modulation band Δf and the length L of the CPW electrode. Hereinafter, Δf·L or Δf will be often referred to as the "(3 dB) modulation band".

When the voltage for switching the light output from an ON condition to an OFF condition (that is, the half-wave voltage $V\pi$) is small, a higher efficiency is achieved. FIG. 6 shows the relation between the thickness D of the buffer layer 3 and the product ($V\pi$·L) of the half-wave voltage $V\pi$ and the interacting length L.

As indicated in the formula (1), the modulation band Δf is in inverse proportion to the mismatch between the effective index $n_m$ of the microwave and the effective index $n_o$ of the light. Therefore, as shown in FIG. 5, as the thickness D of the buffer layer becomes large, and as the mismatch between the effective index $n_m$ of the microwave and the effective index $n_o$ becomes small, the rate of increase of the modulation band becomes high.

On the other hand, as shown in FIG. 6, $V\pi$·L increases substantially linearly with an increase of the thickness D of the buffer layer 3. The ratio of Δf·L to $V\pi$·L (Δf/$V\pi$) represents a modulation index, and it is desirable that this value be high. As shown in FIG. 7, Δf/$V\pi$ tends to increase with an increase of the thickness D of the buffer layer 3, but a marked improvement in optical modulation efficiency can not be expected.

Also, as shown in FIG. 4, when the thickness of the buffer layer 3 is increased, the value of the characteristic impedance $Z_o$ tends to increase, so that it is difficult to achieve matching with an external circuit. Therefore, in view of the impedance matching with the external circuit, if $Z_o$ is determined to be about 50±10 Ω, then it is necessary that the thickness D of the buffer layer 3 be set to not more than about 1 μm.

Accordingly, as is clear from FIG. 7, Δf/$V\pi$ is not more than 1.7. Also, when the length L is increased, the microwave conductor loss and the value of the dc resistance are increased, which makes it difficult to obtain good modulation characteristics.

FIG. 8 shows an optical modulator invented by Mitomi et al. and disclosed in Japanese Patent Application Laying-Open No. 91,111/89. FIG. 9 shows an optical modulator proposed in the Second Optoelectronics Conference (OEC '88) Post-Deadline Papers Technical Digest, PD-1 (Oct. 1988, Tokyo).

In FIG. 8, the thickness of traveling wave electrodes 10 and 11 (here, asymmetrical coplanar strips are used as one example) is increased in an attempt to decrease the microwave effective index $n_m$. With this construction, the characteristic impedance $Z_o$ is also decreased together with the microwave effective index $n_m$.

FIG. 9 shows a structure which improves such characteristics. In this case, the thickness D of the buffer layer 3 is increased to about 1 μm so as to increase the characteristic impedance $Z_o$, thereby compensating for the reduction of $Z_o$ caused when the thickness of electrodes 10 and 11 is increased to 10 μm. Further, as described above for the prior art of FIG. 3 with reference to the formula (1) and FIG. 7, the increase of the thickness of the buffer layer 3 also improves the value of Δf/$V\pi$. However, in order to achieve velocity matching between the light and the microwave, it is necessary to set the thickness of the electrodes to not less than 10 μm, and manufacturing difficulties, such as a short circuit between the electrodes 11, are inevitably encountered. Therefore, with this technique, it is difficult to carry out light modulation over a very wide band.

As described above, with the conventional constructions, the matching of the characteristic impedance can not be sufficiently achieved, or the microwave conductor loss can not be kept to a low level, or the half-wave voltage can not be decreased, or the velocity of the microwave can not match the velocity of the light wave. Therefore, it has been very difficult to achieve both a wide band characteristic and a low driving voltage characteristic.

SUMMARY OF THE INVENTION

It is therefore a first object of the present invention to provide an electrically controlled optical device which is rendered highly efficient over a wide band by overcoming the above-mentioned problems, such as a characteristic impedance mismatching between the electrodes and an external circuit, an increase in the microwave conductor loss, an increase in the half-wave voltage, and a mismatching between the velocity of light and the velocity of the microwave.

When such an electrically controlled optical device having a high efficiency over a wide band is actually to be produced, there are used known techniques such as an air bridge as commonly used in the manufacture of a microwave integrated circuit. However, in this case, it is necessary to precisely form an overlaid layer of not more than 10 μm thickness over a length of several centimeters, and therefore the fabrication cannot be effected easily, thus making its manufacture difficult.

Therefore, a second object of the present invention is to provide a method of easily producing an electrically controlled optical device which is highly efficient over a wide band, which method overcomes the above difficulties heretofore involved in the manufacture of an electrically controlled optical device.

In order to achieve the above first object, according to the present invention, there is provided an electrically controlled optical device comprising:

a substrate having electro-optic effects and having at least one optical waveguide;

a buffer layer provided on the substrate;

traveling wave electrodes provided on the buffer layer and comprising a center electrode and earth electrodes; and a shield conductor provided near to a region where the optical waveguide interacts with the traveling wave electrodes, the shield conductor confronting the traveling wave electrodes through an overlaid layer;

the thickness of the buffer layer and the thickness of the overlaid layer being so determined that the microwave effective index of the substrate with respect to a modulating microwave signal applied to the traveling wave electrodes approaches the effective index of light propagated through the optical waveguide, and also that the characteristic impedance of the traveling wave electrodes approaches the characteristic impedance of an associated external microwave circuit.

The thickness of the overlaid layer is 3 to 10 μm if its dielectric constant is about 1 (for example, air). The thickness of the buffer layer is 0.5 to 2.0 μm if its dielectric constant is not more than 4.5 (for example, silicon dioxide or Teflon).

In the above construction, the thickness of the buffer layer is much increased as compared with the prior art, and the shield conductor is provided. Therefore, broad-band light modulation can be achieved without unduly increasing the driving voltage.

The inventors of the present invention have attempted to further enhance the performance of the above electrically controlled optical device of the present invention, and have found that this electrically controlled optical device can be further improved in the following points:

In the above electrically controlled optical device of the present invention, it is necessary to use a thick buffer layer in order to reduce the microwave propagation loss and to reduce the velocity mismatching between the microwave and the light. Therefore, the interaction between the microwave and the light wave is less active. Further, in this electrically controlled optical device, since the earth electrodes are wide, the lines of electric forces from the center electrode are distributed widely over the earth electrode, and as a result the efficiency of overlapping (i.e., interaction) between the microwave and the light is about five times greater at the central electrode than at the earth electrodes.

Therefore, in order to keep the driving voltage to not more than 5 V at an operating wavelength of 1.5 μm, it is necessary that the length L of interaction between the microwave and the light should be long, on the order of about 2.7 cm. Therefore, because of losses by the microwave conductor, the 3 dB modulation band is limited to 20 GHz at best.

In the present invention, in order to lessen such band limitation due to the increased microwave conductor loss, the buffer layer is made of a material (for example, a Teflon-type resin; dielectric constant $\epsilon \approx 1.9$) which is lower in dielectric constant than the heretofore-used materials such as silicon dioxide, $SiO_2$ ($\epsilon = 3.9$) and alumina, $Al_2O_3$ ($\epsilon = 9.6$).

With this construction, the buffer layer can be greatly reduced in thickness as compared with the conventional silicon dioxide layer. Therefore, when the driving voltage is designed to be the same as that of the prior art, the electrode length can be reduced, which enables the modulation band to be widened greatly. Also, when the electrode length is designed to be the same as that of the prior art, the driving voltage can be reduced greatly.

Further, in the present invention, in order to overcome the band limitation due to the increased microwave conductor loss, at least those portions of the substrate disposed close to the electrodes are recessed, and at a region where light and the microwave interact with each other, part or the whole of the traveling wave electrode structure is spaced apart from that portion of the substrate disposed close to the optical waveguide, so that the microwave conductor loss is reduced, so that the effective index of the microwave conductor through the traveling wave electrode approaches the effective index of the light propagated through the optical waveguide, and so that the characteristic impedance of the traveling wave electrode approaches the characteristic impedance of the associated external circuit.

With this construction, the lines of electric force interconnecting the center electrode and the earth electrodes perceive a thick buffer layer with a low dielectric constant (for example, the dielectric constant of $SiO_2$ is about 4), and therefore the microwave effective index can be reduced as in the case where the buffer layer is uniformly thick. On the other hand, the depth from the interface between the air and the buffer layer to the optical waveguide can be reduced as compared with the case where the buffer layer is uniformly thick. Therefore, the efficiency of interaction between the microwave and the light becomes higher, so that the driving voltage can be reduced. As a result, the interacting length can be reduced, so that the band can be widened.

FIG. 10 shows a velocity matching-type optical modulator proposed by Sato et al. in the Journal of Institute of Electronics and Communication Engineers of Japan (vol. J.69-C, pp. 1291-1296, 1986). At first glance, this construction appears similar to the above construction of the present invention, but differs therefrom in that the edges of electrodes 4 and 5 which produce an electric field of high intensity are disposed in contact with a substrate 1 of a high dielectric constant (the value of this dielectric constant is approximately 35, taking the anisotropy into consideration), and in that a shield conductor is not provided. Because of these differences, the microwave effective index is not reduced sufficiently, and as a result, this conventional optical modulator suffers from the drawback that it is difficult to achieve complete velocity matching.

FIG. 11 shows a construction proposed by Izutsu et al. in literature entitled "Picosecond Electronics and Optoelectronics" (G. A. Mourou et al. ed.), pp. 172-175, Springer-Verlag, 1985. At first glance, this construction also appears similar to the above construction of the present invention, but differs therefrom in that the substrate is not recessed at those portions thereof disposed close to electrodes, and in that a shield conductor is not provided. Therefore, the microwave effective index can not be greatly reduced, which results in the drawback that it is difficult to achieve complete velocity matching.

Further, in the present invention, in order to overcome the above band limitation due to the increased microwave conductor loss, a slot is formed through at least one of the earth electrodes.

With this construction, it is possible to interact the microwave and the light at a high efficiency to decrease the driving voltage. As a result, the interacting length can be reduced, and a broad-band light modulation can be achieved.

In order to achieve the above second object (that is, to provide a method of easily producing an electrically controlled optical device which is highly efficient over a wide band), according to the present invention, the following procedure is adopted.

A substrate having electro-optic effects and having at least one optical waveguide is used. A traveling wave electrode structure is fabricated, on a buffer layer in the vicinity of the optical waveguide, to form at least one optical control portion, thereby providing an electrically controlled optical device. Further, a preformed conductor which can precisely determine the thickness of an overlaid layer is fixed in the vicinity of the electrodes of the electrically controlled optical device.

With this method, an overlaid layer of not more than 10 μm thickness can be formed over a length of several centimeters without the need for advanced fabricating techniques, and therefore a high-speed and broad-band electrically controlled optical device of the velocity matching-type can be easily produced.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Preferred embodiments of the invention will now be described in detail with reference to the drawings.

First Embodiment

Figure 12A:
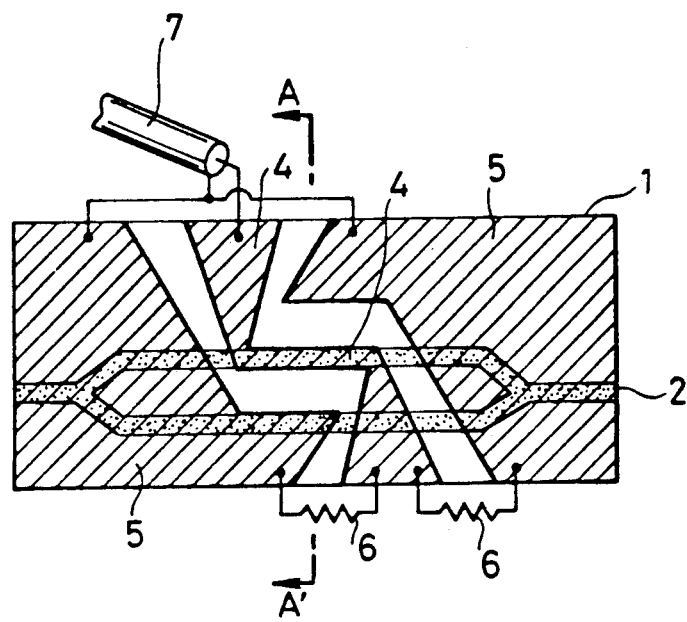
FIG. 12A is a plan view of a first embodiment of the present invention.
Figure 12B:
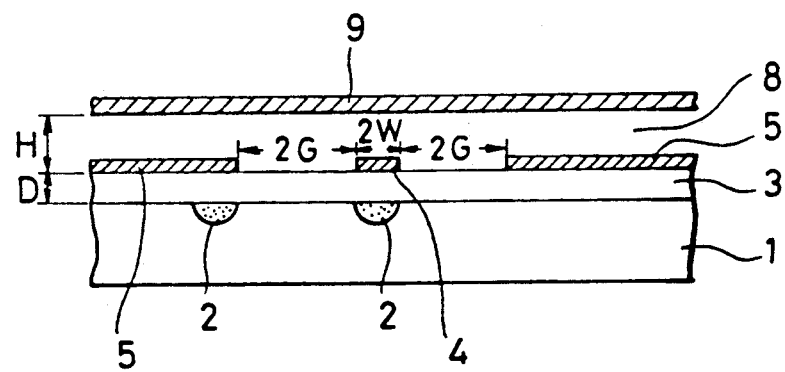
FIG. 12B is a fragmentary cross-sectional view taken along the line A—A' of FIG. 12A.

FIG. 12A is a plan view of a first embodiment of the invention, and FIG. 12B is a fragmentary, enlarged cross-sectional view taken along the line A—A' of FIG. 12A. In FIG. 12A, a shield conductor 9 is omitted for illustration purposes.

Figure 3A:
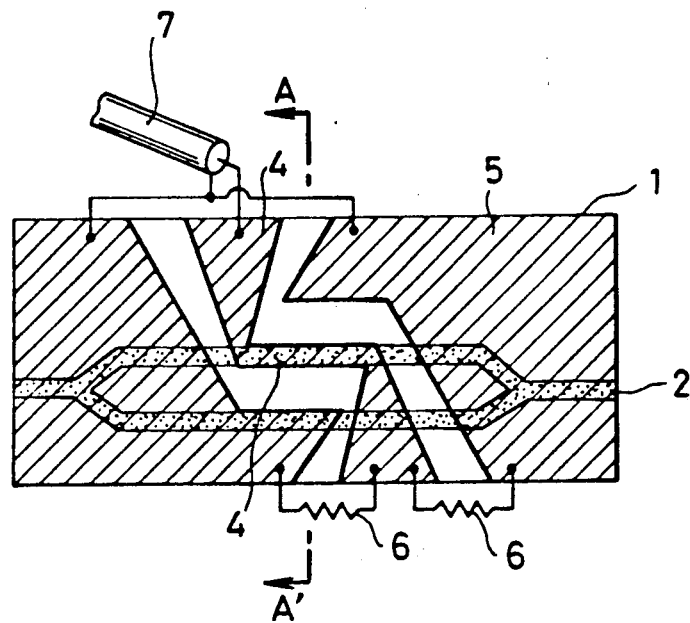
FIG. 3A is a plan view of an optical modulator disclosed in an earlier Japanese patent application.
Figure 3B:
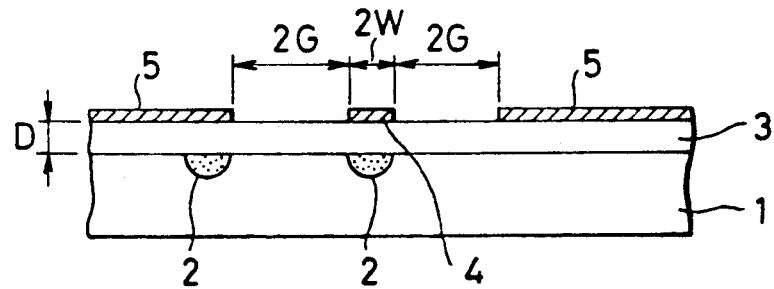
FIG. 3B is a fragmentary cross-sectional view taken along the line A—A'of FIG. 3A.

In this embodiment as in the conventional example of FIGS. 3A and 3B, a center electrode 4 and earth electrodes 5, which serve as traveling wave electrodes, are disposed above a substrate 1 of $LiNbO_3$ having electro-optic effects and having two optical waveguides 2. In this embodiment, the shield conductor 9 is arranged through an overlaid layer 8 in the vicinity of the region where the optical waveguides 2 interact with the traveling wave electrodes 4 and 5. In this optical modulator of the above construction, the thickness of a buffer layer 3 and the thickness of the overlaid layer 8 are determined so that the microwave effective index $n_m$ of the substrate 1 with respect to a modulating microwave signal supplied from a feeder 7 to the traveling wave electrodes 4 and 5 approaches the effective index $n_o$ of light propagated through the optical waveguides 2, and so that the characteristic impedance $Z_o$ of the traveling electrodes 4 and 5 approaches the characteristic impedance of an associated external microwave circuit.

In this embodiment, the width 2W of the center electrode 4 is 8 μm, and the width of the gaps 2G between the electrode 4 and the electrodes 5 is 15 μm, and the width of the optical waveguides 2 is 6 μm and hence is generally equal to the width of the center electrode 4. The thickness D of the buffer layer 3 of $SiO_2$ is 1.2 μm.

Figure 4:
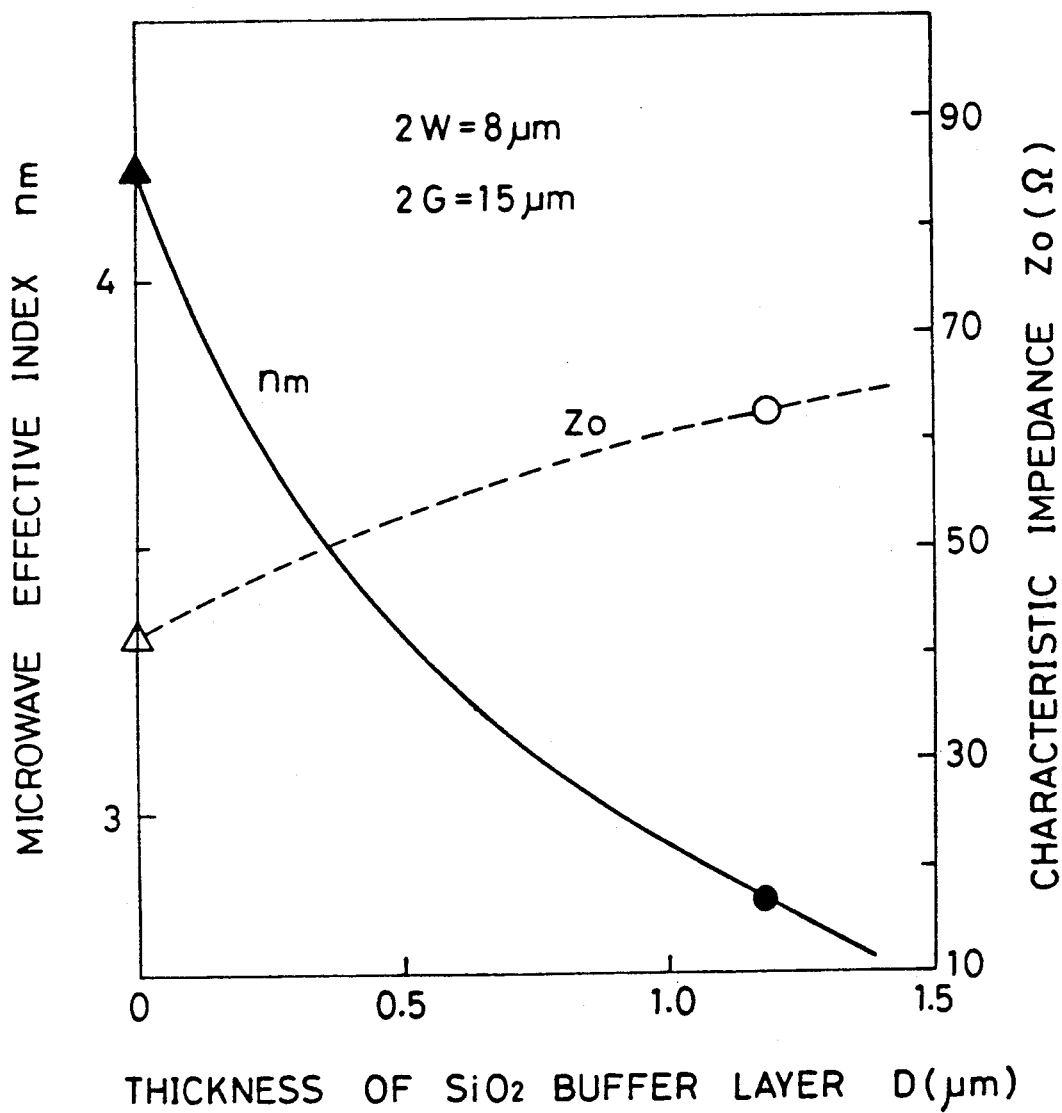
FIG. 4 is an illustration showing the relation of the thickness D of a buffer layer with a microwave effective index $n_m$ and the characteristic impedance $Z_o$ in the optical modulator of FIGS. 3A and 3B.
Figure 5:
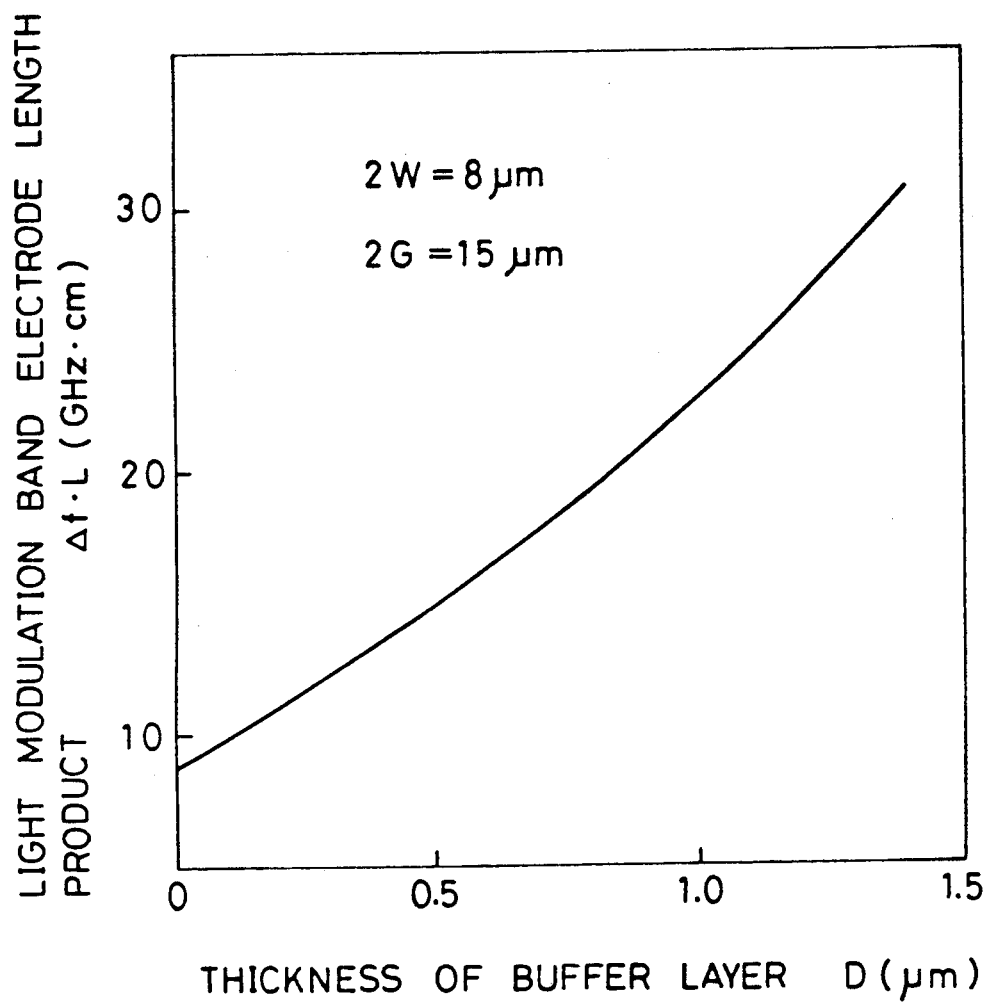
FIG. 5 is an illustration showing the relation between the 3 dB light modulation band $\Delta f \cdot L$ and the thickness D of the buffer layer in the optical modulation of FIGS. 3A and 3B.
Figure 6:
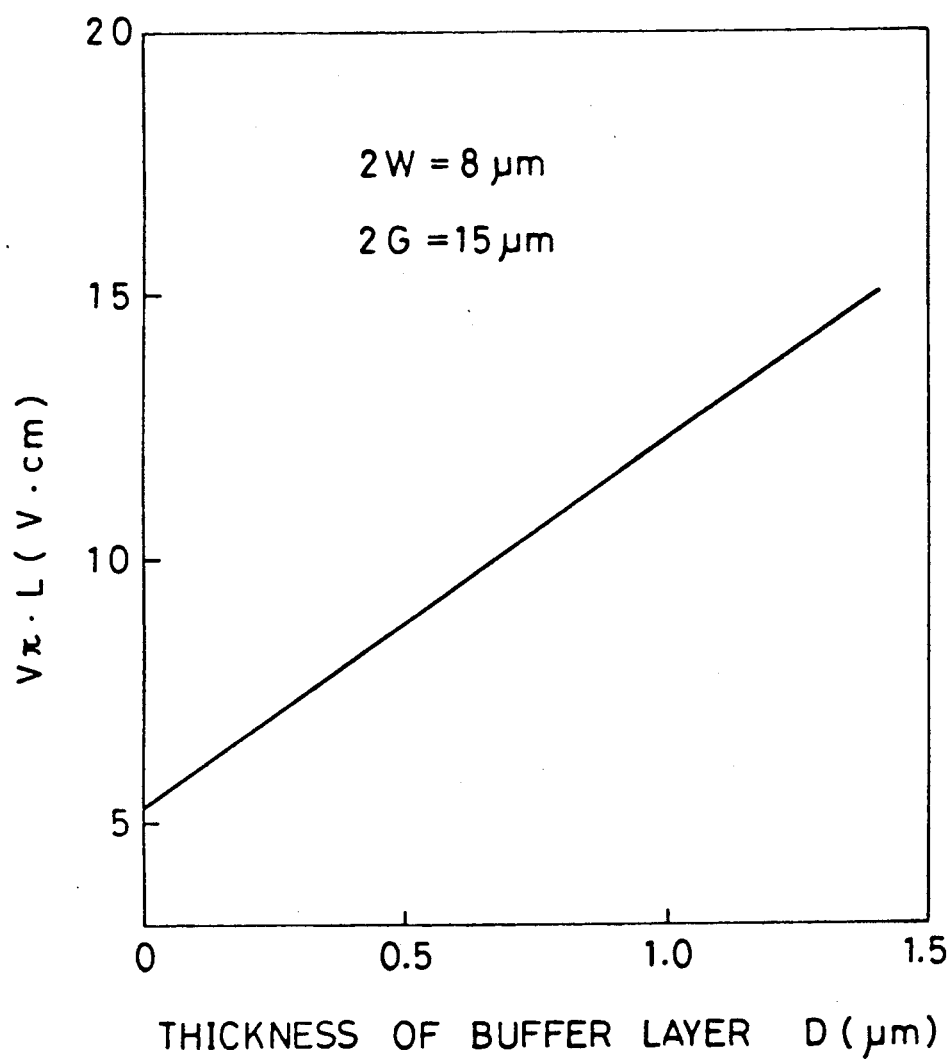
FIG. 6 is an illustration showing the relation between the product ($V\pi \cdot L$) of the half-wave voltage $V\pi$ and the interacting length L and the thickness D of the buffer layer in the optical modulator of FIGS. 3A and 3B.

. In this embodiment, the relation of the microwave effective index $n_m$ and the characteristic impedance $Z_o$ with the thickness H of the overlaid layer 8 is analyzed according to the analysis procedure used in FIG. 4, and the results of this analysis are shown in FIG. 13.

In the optical modulator of this embodiment, using the Z-cut $LiNbO_3$ substrate 1, it is absolutely necessary to provide the buffer layer 3 in order to reduce losses resulting from the absorption of the light (which propagates through the waveguides 2) by the electrodes 4 and 5. Here, however, in order to clarify the influence of the buffer layer 3, the calculated results both for the case of D=1.2 μm and for the case of D=0 μm are shown in FIG. 13.

Figure 13:
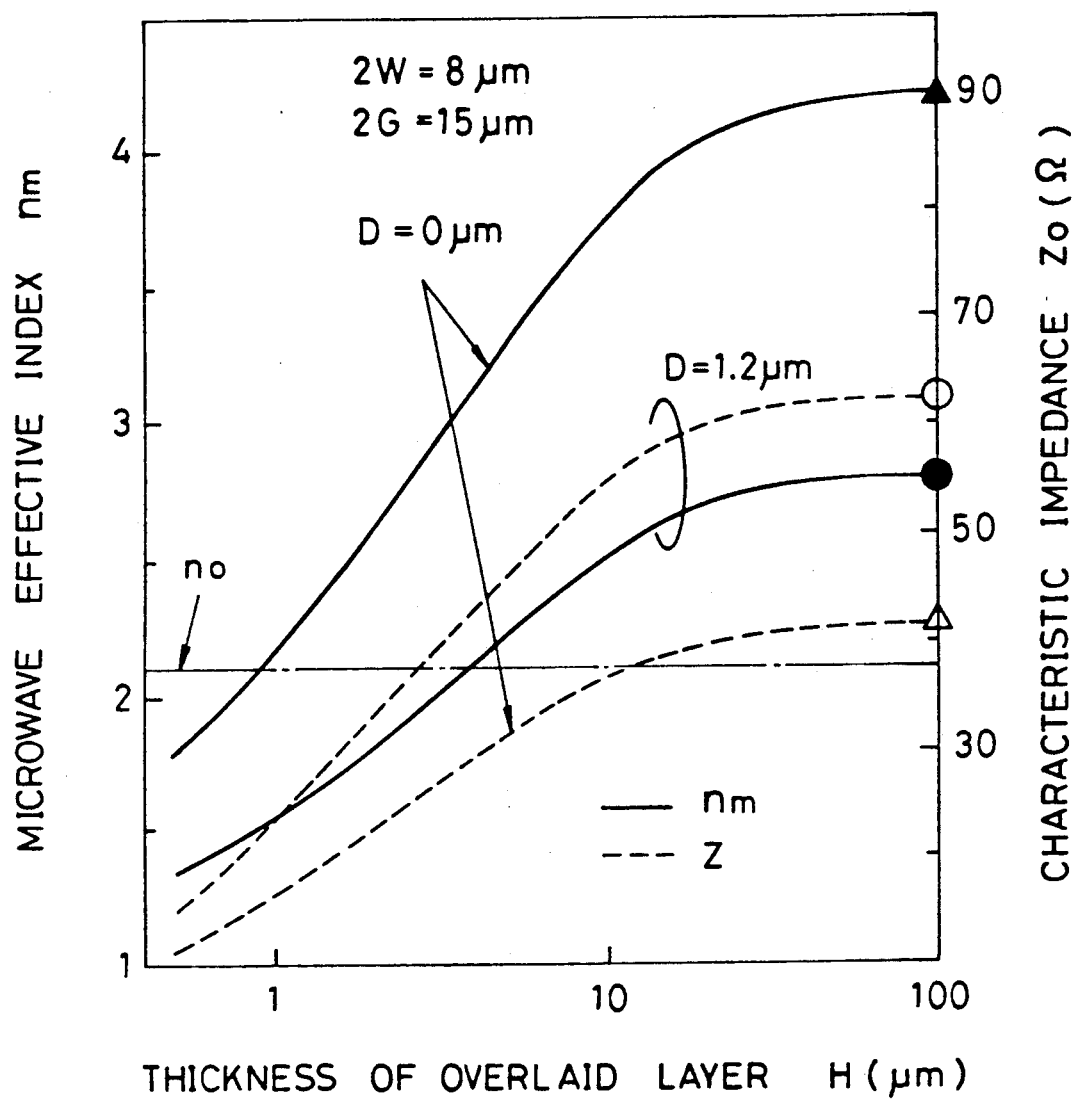
FIG. 13 is an illustration showing the relation of the thickness H of an overlaid layer with a microwave effective index $n_m$ and the characteristic impedance $Z_o$ in the first embodiment.

As can be seen from FIG. 13, as the thickness H of the overlaid layer 8 increases, $n_m$ and $Z_o$ approach to respective constant values. In the case where the shield conductor 9 is not provided (that is, in the case of the prior art of FIGS. 3A and 3B), such constant values correspond to the calculated values shown in FIG. 4. In FIG. 13, the constant values in the case of D=1.2 μm are indicated by circle marks, and the constant values in the case of D=0 μm are indicated by triangular marks, and the values corresponding to these values are indicated by identical marks in FIG. 4.

As can be seen from these Figures, irrespective of the thickness D of the buffer layer 3, as the thickness H of the overlaid layer 8 decreases, the value of the microwave effective index $n_m$ decreases and approaches the effective index $n_o$ of the optical waveguide 2, and also the characteristic impedance $Z_o$ decreases. However, in the case of D (thickness of the buffer layer 3)=0, when the thickness H of the overlaid layer 8 is so selected that $n_m$ becomes equal to $n_o$ (=2.1), $Z_o$ is much lower than 50±10 Ω and is about 16 Ω. Therefore, an impedance mismatching occurs, and as a result broad-band operation can not be expected.

Figure 14:
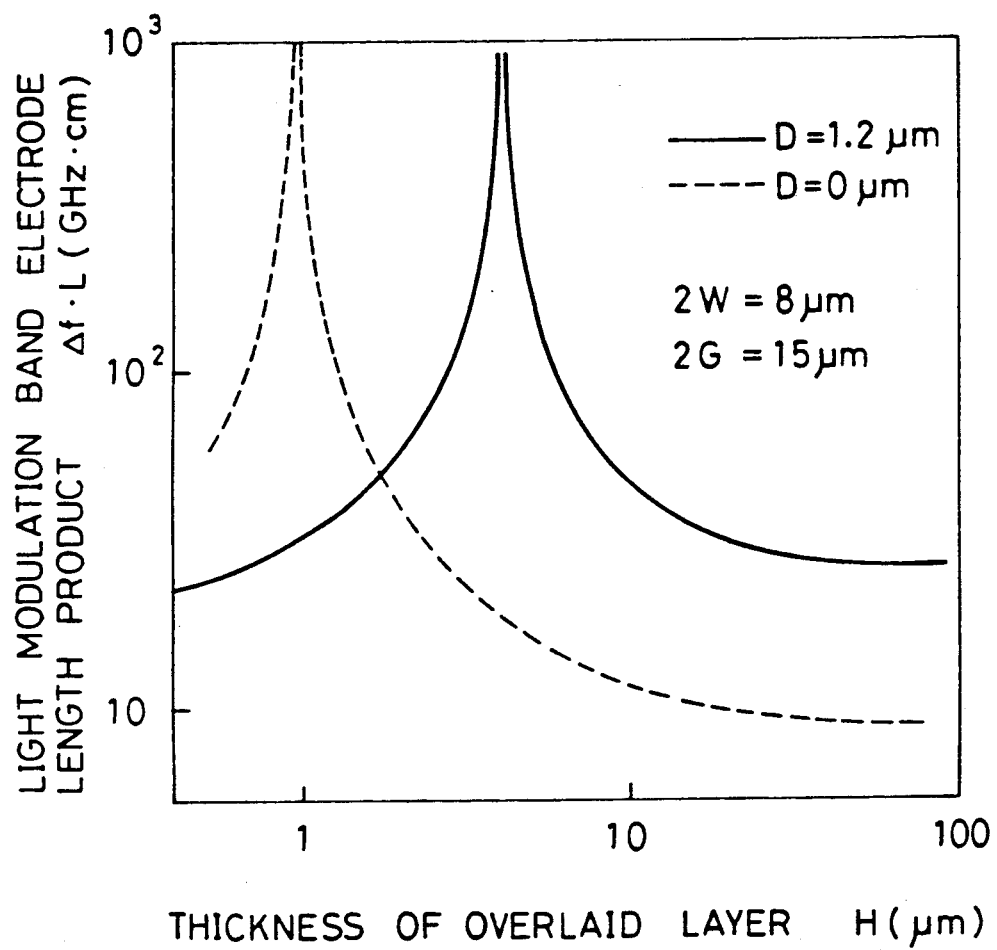
FIG. 14 is an illustration showing the relation between the light modulation band $\Delta f \cdot L$ and the thickness H of the overlaid layer in the first embodiment, in which the microwave conductor loss $\alpha$ is not taken into consideration.

On the other hand, in the case of D=1.2 μm, when the thickness of the overlaid layer 8 is about 5 μm, $Z_o$ is about 42 Ω, and good matching with the external circuit can be achieved, and also $n_m$ and $n_o$ can be close to each other. Therefore, broad-band operation can be achieved as shown in FIG. 14. By suitably determining the thickness D of the buffer layer 3 and the thickness H of the overlaid layer 8, the desired characteristic impedance $Z_o$ and the desired band Δf·L can be achieved.

Figure 15:
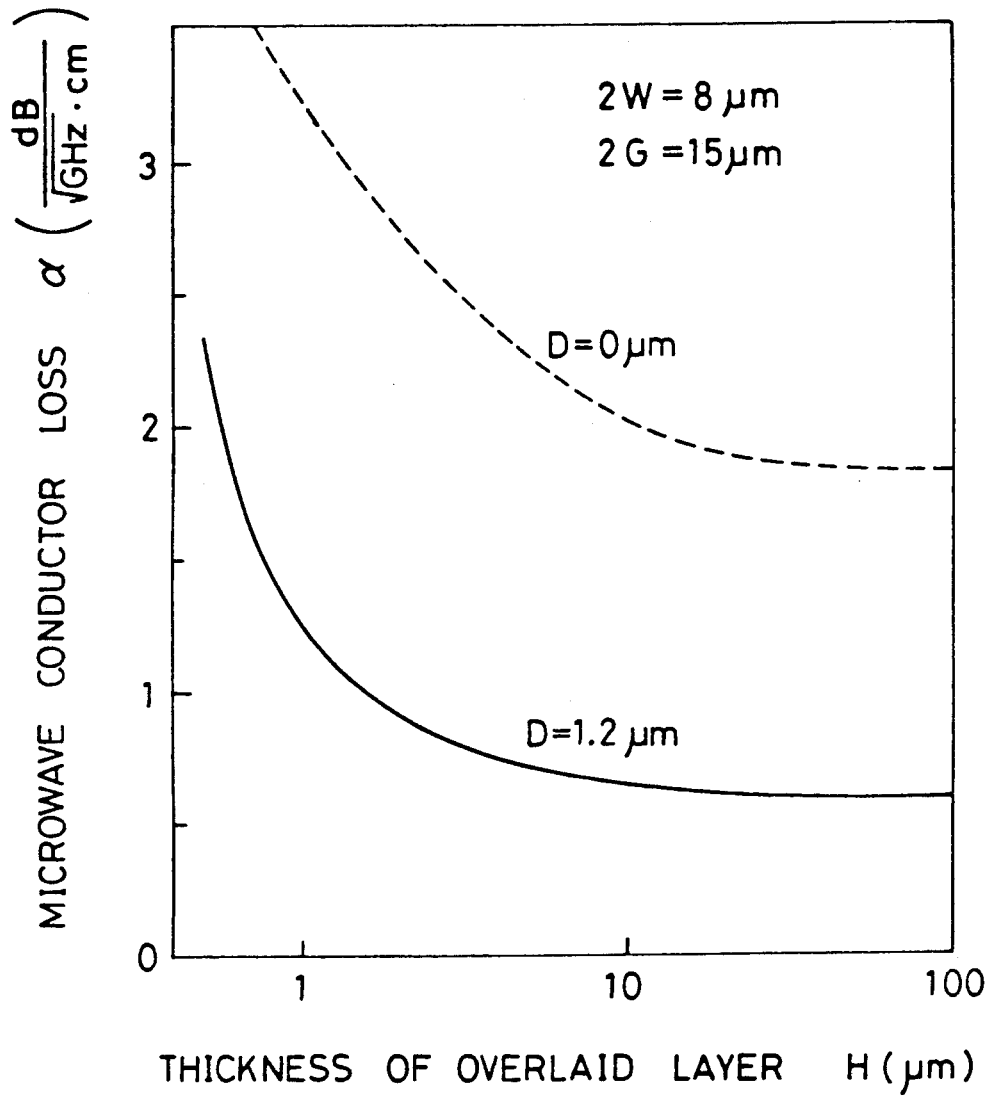
FIG. 15 is an illustration showing the relation between the microwave conductor loss through a traveling wave electrode structure and the thickness H of the overlaid layer in the first embodiment.

FIG. 15 shows the results of the calculation of the microwave conductor loss α according to the thickness H of the overlaid layer 8 in the embodiment of FIGS. 12A and 12B. Here, the thickness D of the buffer layer 3 is used as a parameter. As can be seen from FIG. 15, when the thickness D of the buffer layer 3 is large, the microwave conductor loss α can be reduced, which is advantageous for broad-band operation. α increases with a decrease of H, but it is clear from FIG. 15 that the degree of such increase is small.

Figure 16:
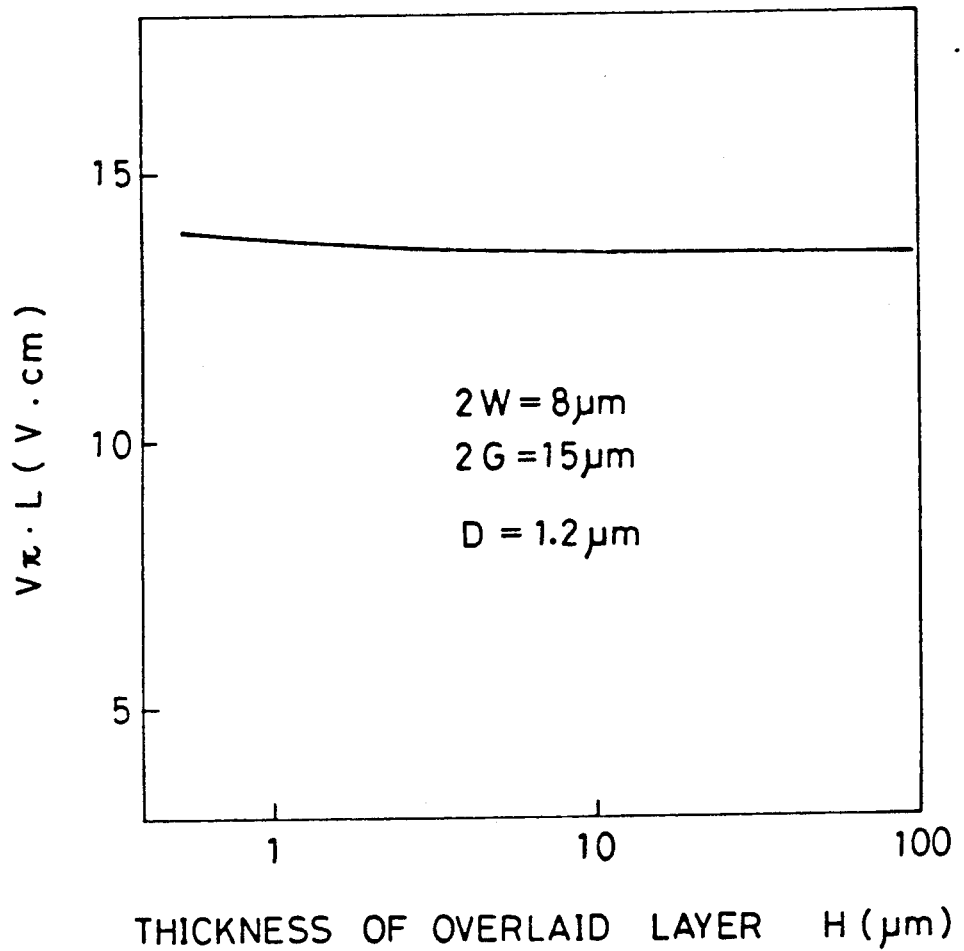
FIG. 16 is an illustration showing the relation between $V\pi \cdot L$ and the thickness of the overlaid layer in the first embodiment.

FIG. 16 shows the results of the calculation of Vπ·L according to the thickness H of the overlaid layer 8 in the embodiment of FIGS. 12A and 12B. Here, the thickness D of the buffer layer 3 is 1.2 μm. As can be seen from FIG. 16, the influence of the thickness H of the overlaid layer 8 on Vπ·L is sufficiently small.

Figure 7:
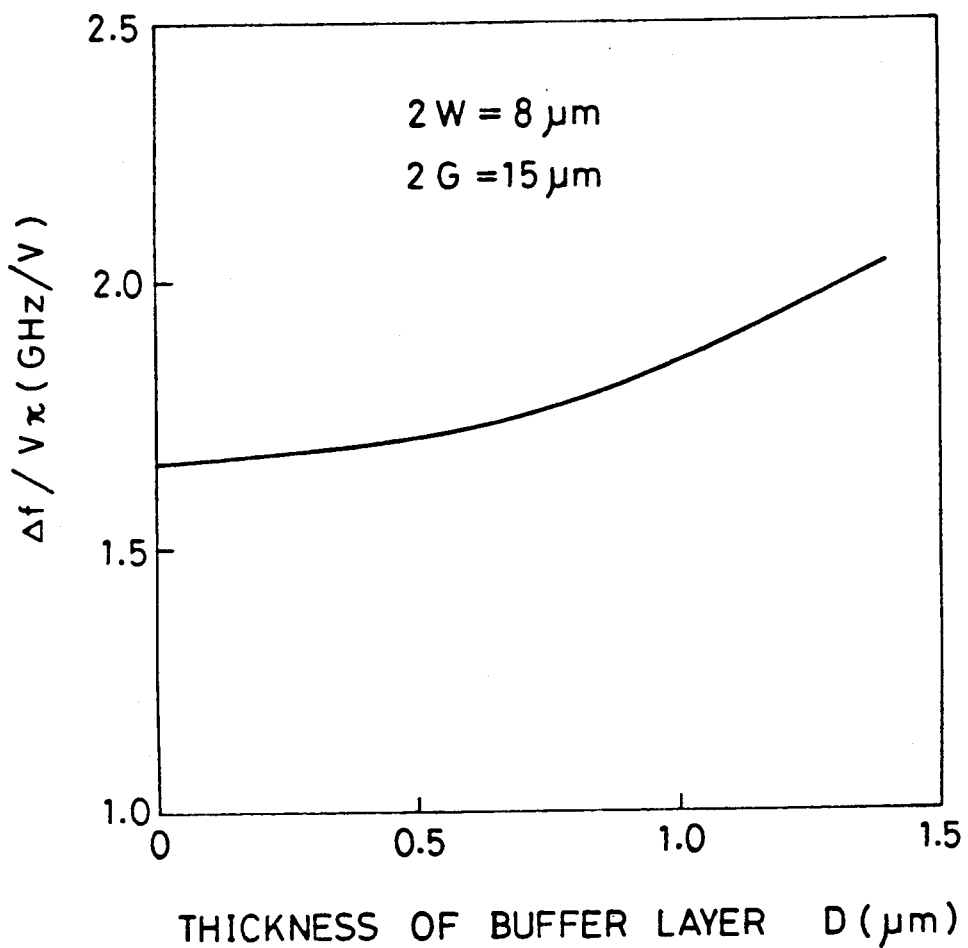
FIG. 7 is an illustration showing the relation between the ratio ($\Delta f/V\pi$) and the thickness D of the buffer layer in the optical modulator of FIGS. 3A and 3B.
Figure 8:
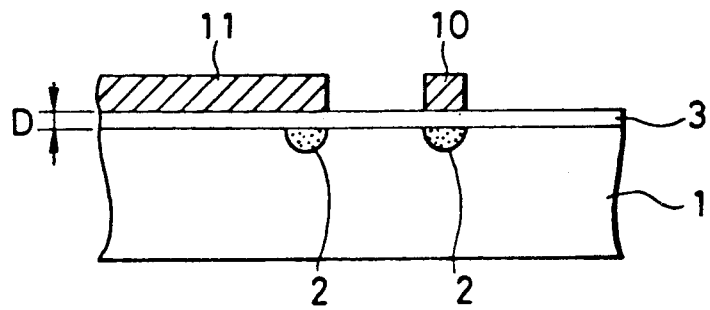
FIG. 8 is a fragmentary cross-sectional view of an optical modulator disclosed in an earlier Japanese patent application.
Figure 9:
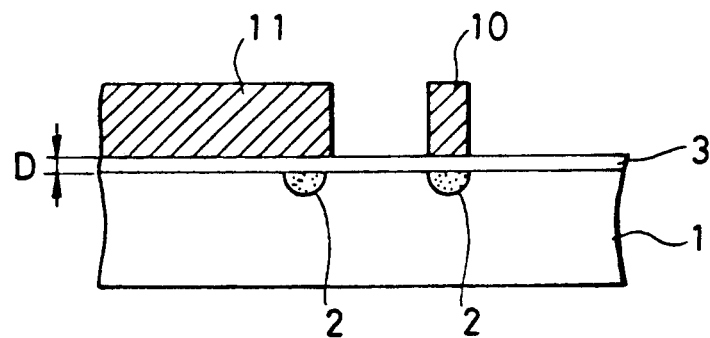
FIG. 9 is a fragmentary cross-sectional view of a further conventional optical modulator.
Figure 10:
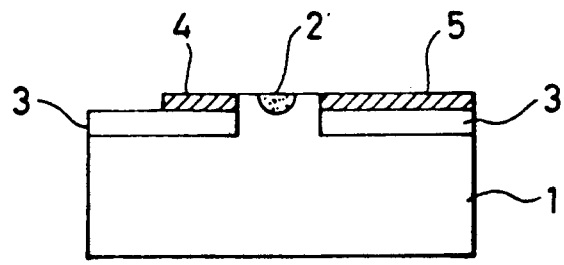
FIGS. 10 and 11 are cross-sectional views of further conventional optical modulators, respectively.
Figure 11:
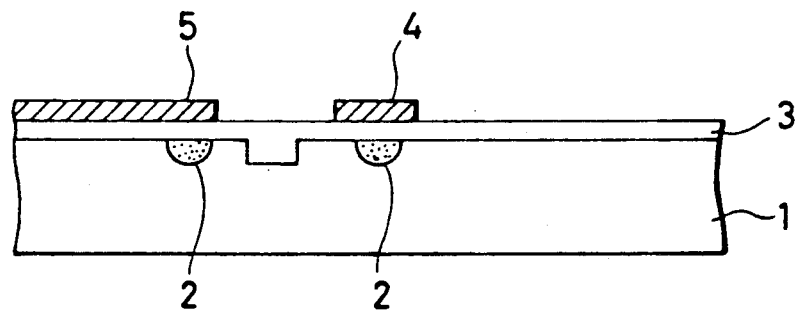
Figure 17:
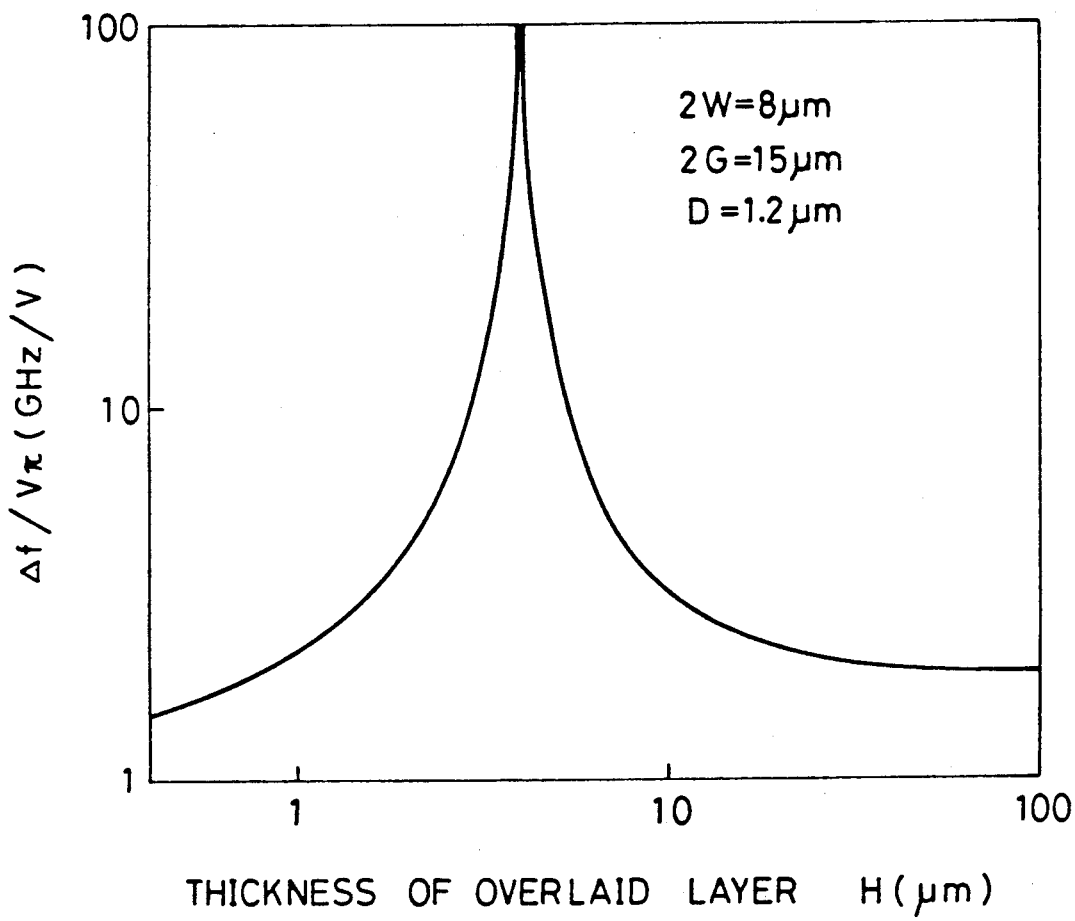
FIG. 17 is an illustration showing the relation between the ratio ($\Delta f/V\pi$) and the thickness H of the overlaid layer in the first embodiment.

FIG. 17 shows the value of Δf/Vπ when the thickness H of the overlaid layer 8 is used as a variable. This value is small, that is, less than 2, in the prior art shown in FIG. 7. However, as can be seen from FIG. 17, in this embodiment, Δf/Vπ can be increased greatly.

As described above, in this embodiment, when the thickness D of the buffer layer 3 of $SiO_2$ is 1.2 μm, light modulation can be achieved over an extremely broad band if the thickness H of the overlaid layer 8 is in the range of between about 5 μm and about 10 μm. Therefore, when the length L of the CPW electrodes 4 and 5 (that is, the length L of interaction between the microwave and the light) is 2 cm, the half-wave voltage can be set to a low level of about 6.7 V over a light modulation band of several tens to several hundreds GHz. Also, the characteristic impedance $Z_o$ can be set to 44 to 55 Ω, and can well match the characteristic impedance of the external circuit.

In this embodiment, although the thickness D of the $SiO_2$ buffer layer 3 is 1.2 μm, the values of D, H and 2G can be suitably changed according to the desired modulation band so that $Z_o$ can be 50 Ω.

Although the substrate 1 having the optical waveguides 2 formed therein is made of $LiNbO_3$, the substrate can be made of any other suitable material having electro-optic effects, such as $LiTaO_3$ and $KTiOPO_4$.

Further, by using linear optical waveguides or a directional coupler as the optical waveguides 2, a phase modulator or a switch can be constructed. Further, the optical waveguides 2 can be formed by ion exchange or by the formation of ridges, instead of Ti thermal diffusion.

Figure 18A:
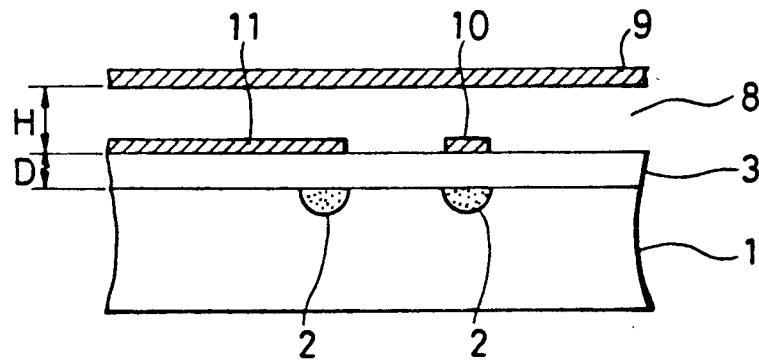
FIG. 18A is a fragmentary cross-sectional view of a modified form of the invention, using asymmetrical coplanar strips as electrodes.
Figure 18B:
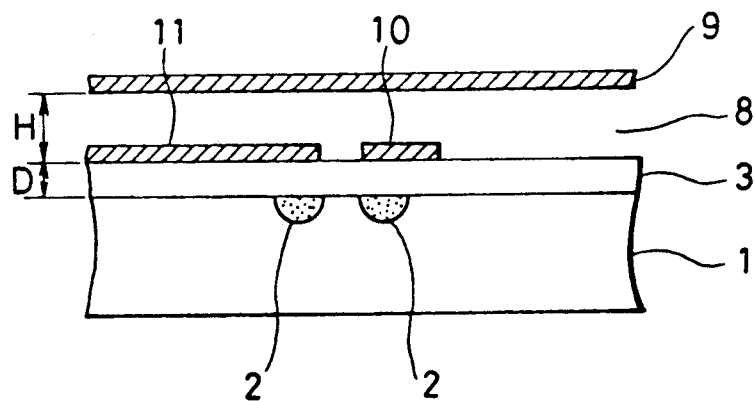
FIG. 18B is a fragmentary cross-sectional view of another modified form of the invention, using a directional coupler as optical waveguides, thereby providing an optical modulator or an optical switch.

In this embodiment, although the traveling wave electrodes 4 and 5 have been described as the CPW electrodes, the traveling wave electrodes can be constituted, for example, as asymmetrical coplanar strip electrodes 10 and 11 as shown in FIGS. 18A and 18B. The electrodes 10 and 11 are respectively a central electrode and an earth electrode of the asymmetrical coplanar strip formed on the buffer layer 3 of $SiO_2$.

In the structure of FIG. 18A, Mach-Zehnder optical waveguides are used as the optical waveguides 2. FIG. 18B shows an optical switch employing a directional coupler in which two optical waveguides 2 are connected together and disposed close to each other.

If linear waveguides are used, an optical phase modulator can be constructed, in which case an X-cut $LiNbO_3$ substrate may be used.

Second Embodiment

Figure 1A:
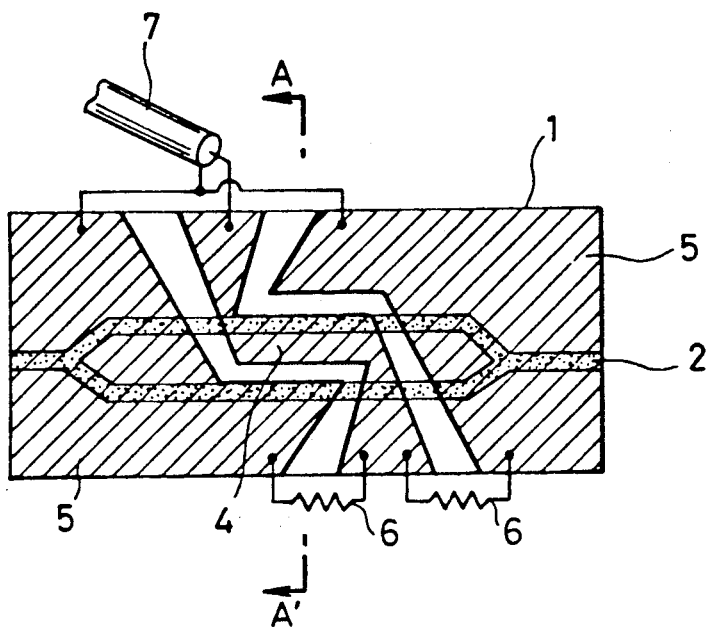
FIG. 1A is a plan view of a conventional Mach-Zehnder light intensity (optical) modulator.
Figure 1B:
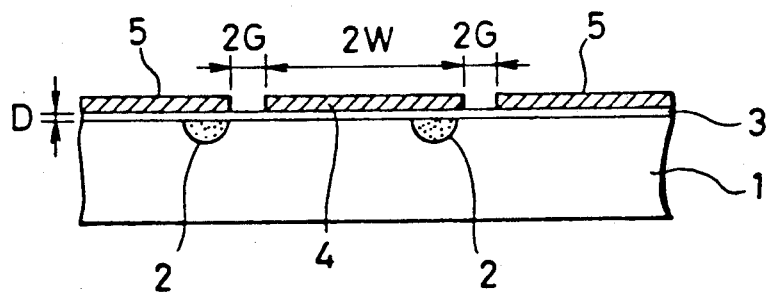
FIG. 1B is a fragmentary cross-sectional view taken along the line A—A' of FIG. 1A.
Figure 19A:
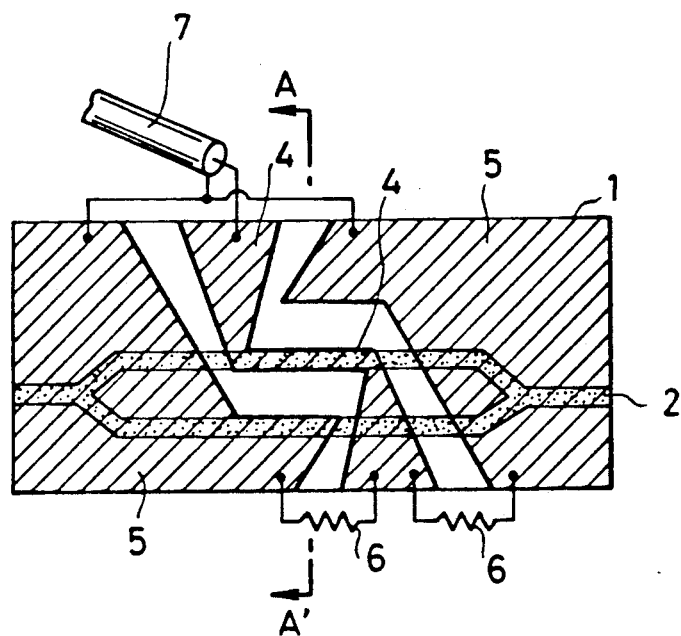
FIG. 19A is a plan view of an electrically controlled optical device according to a second embodiment of the invention.
Figure 19B:
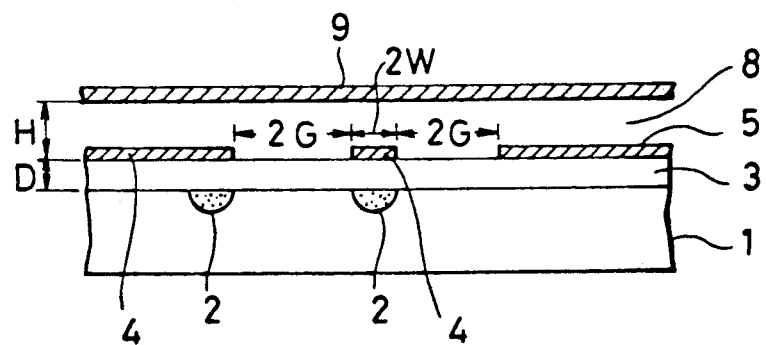
FIG. 19B is a fragmentary cross-sectional view taken along the line A—A' of FIG. 19A.

FIGS. 19A and 19B show a second embodiment of an electrically controlled optical device in accordance with the present invention. This embodiment of FIG. 19 differs from the prior art of FIGS. 1 and 2 in that the buffer layer 3 is made of a Teflon (polytetrafluoroethylene)-type resin (dielectric constant: $\epsilon \approx 1.9$) instead of silicon dioxide ($SiO_2$; dielectric constant: $\epsilon \approx 3.9$). Such Teflon-type resins are, for example, those (dielectric constant: $\epsilon \approx 1.9$; refractive index: $n \approx 1.3$) described in Nikkei New Material, 8-7, p. 17, 1989, and the buffer layer 3 can be provided by forming such a Teflon-type material with a thickness of not more than 1 μm, using spin coating, sputtering or the like.

Figure 20B:
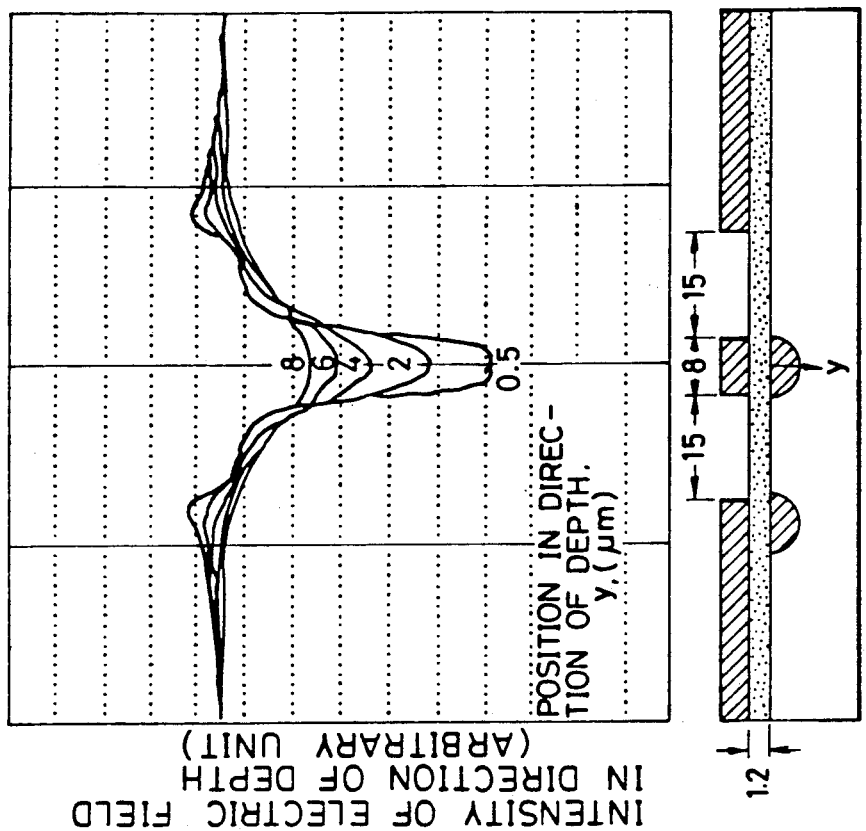
FIGS. 20A and 20B are illustrations showing the profile of a microwave electric field in the direction of the depth.
Figure 20A:
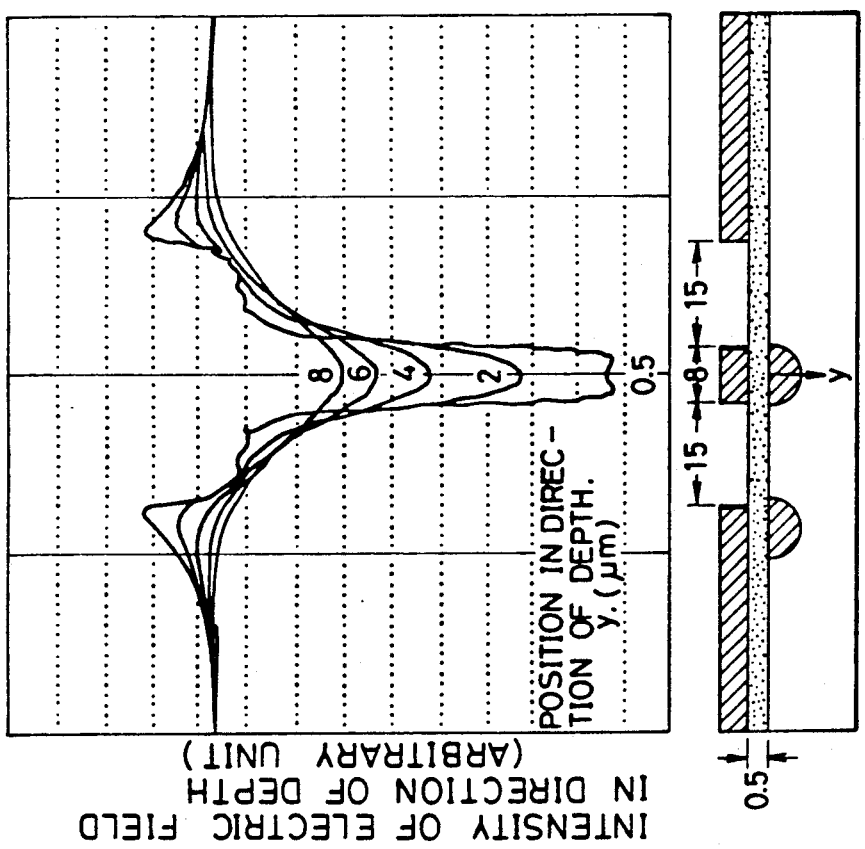
Figure 21:
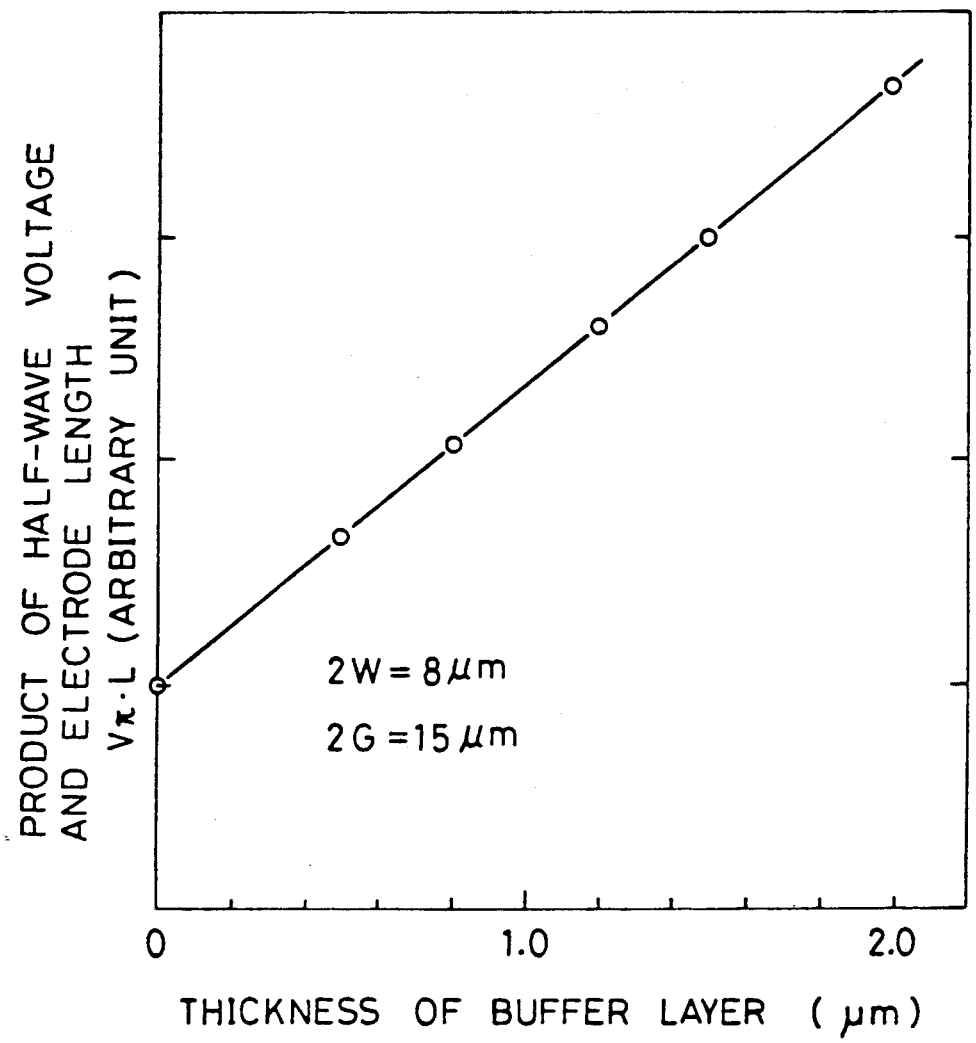
FIG. 21 is an illustration showing the relation between the product ($V\pi \cdot L$), of the half-wave voltage (driving voltage) and the electrode length, and the thickness of the buffer layer in the present invention.

FIGS. 20A and 20B show profiles of the intensity of the electric field in the direction of the depth in the embodiment of FIG. 19, in the case where traveling wave electrodes formed on the buffer layer 3 comprises a center electrode 4 having a width 2W of 8 μm and earth electrodes 5, and the width of the gaps 2G between the center electrode 4 and the earth electrodes 5 is 15 μm. FIG. 20A shows the profiles which the thickness of the buffer layer 3 is 0.5 μm, and FIG. 20B shows the profiles when the thickness of the buffer layer 3 is 1.2 μm. It is clear that the thickness of the buffer layer 3 influences the interaction between the microwave and the light wave. FIG. 21 shows the calculation results representing the relation of the product (Vπ·L) of the half-wave voltage (driving voltage) and the electrode length with the thickness of the buffer layer. In the present invention, when estimating, from the difference in dielectric constant, the thickness of the buffer layer required to obtain the same $n_m$ as in the prior art, it has been found that it is possible to reduce the thickness by about 30% as compared with the prior art. Therefore, it is surmised that Vπ·L can be about ¾, which means that when the electrode length is the same, the driving voltage can be reduced by about 25%.

Figure 2A:
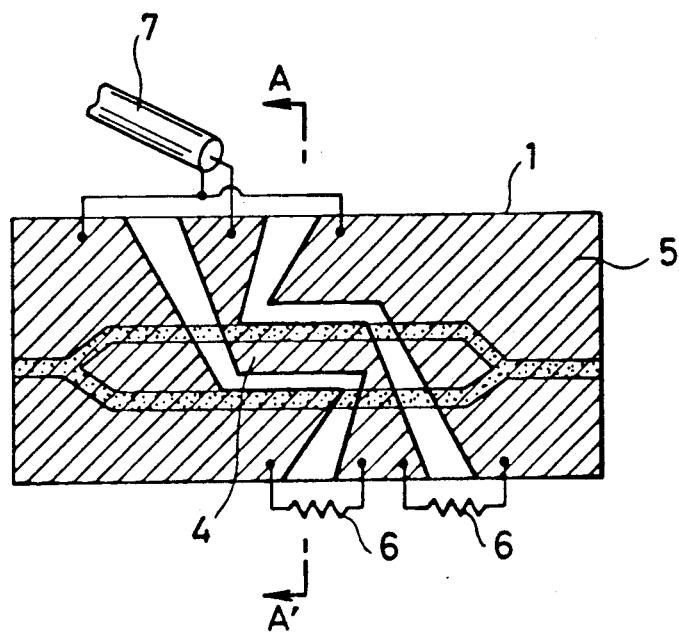
FIG. 2A is a plan view of an optical modulator disclosed in an earlier Japanese patent application.
Figure 2B:
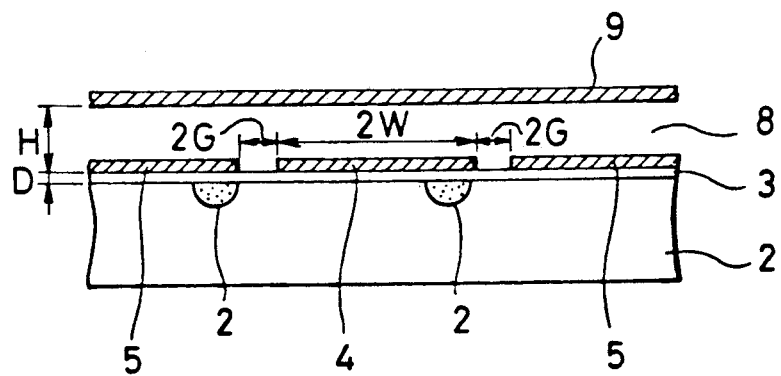
FIG. 2B is a fragmentary cross-sectional view taken along the line A—A' of FIG. 2A.
Figure 22:
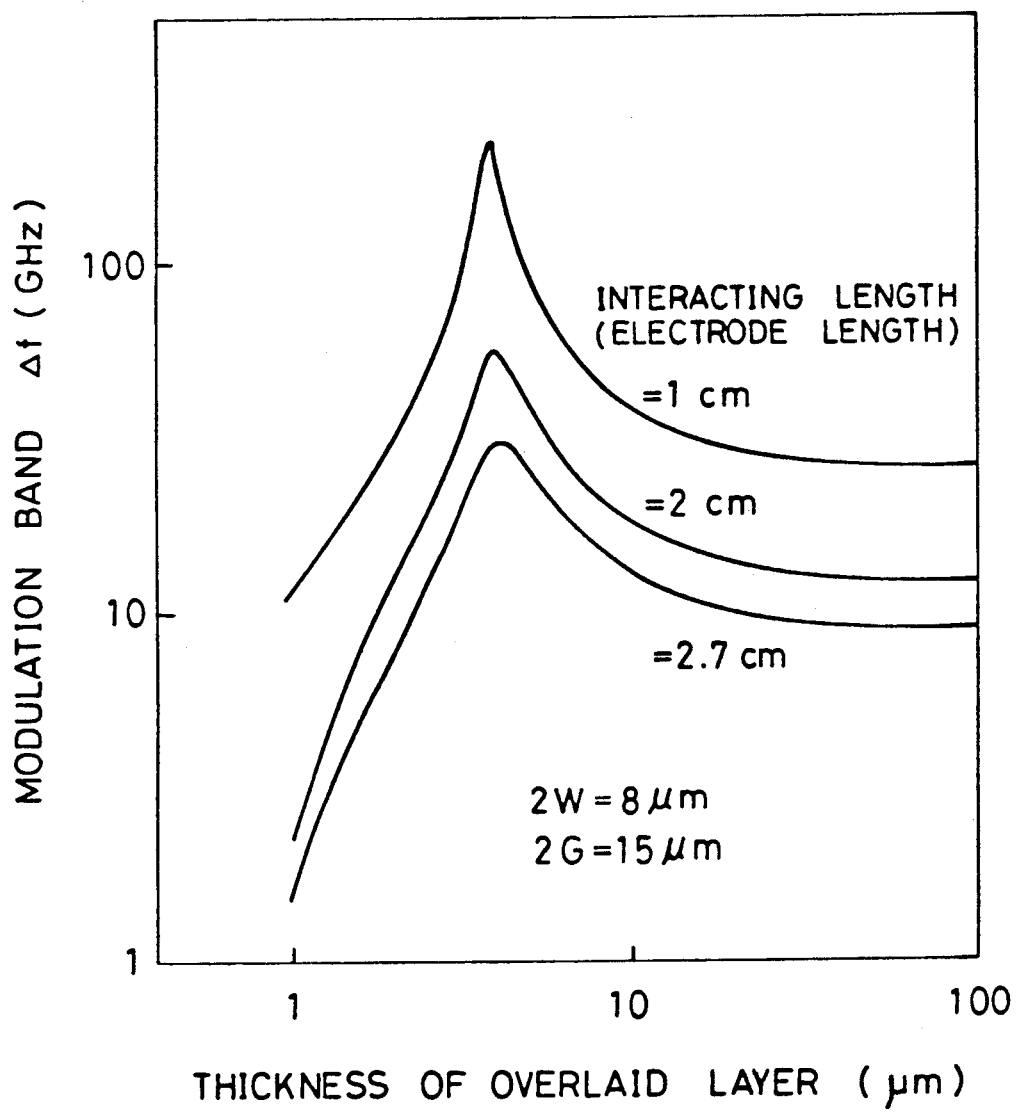
FIG. 22 is an illustration showing calculation results of modulation bands in an electrically controlled optical device to which the present invention is applied.

FIG. 22 shows the results of the calculation of the modulation band, obtained when the present invention is applied to the prior art of FIG. 2. When the prior art is so designed that the driving voltage is not more than 5 V at an operating wavelength of 1.5 μm, the required electrode length is about 2.7 cm, and the modulation band is 20 to 30 GHz. By applying the present invention, the electrode length can be shortened to about 2.0 cm, and therefore it is surmised that the modulation band is not less than 50 GHZ.

Third Embodiment

Figure 23A:
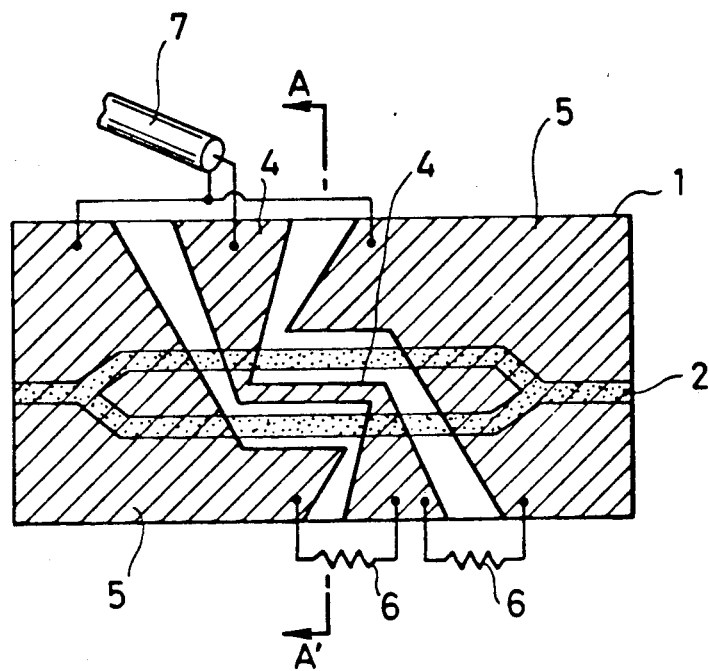
FIG. 23A is a plan view of a third embodiment of the present invention.
Figure 23B:
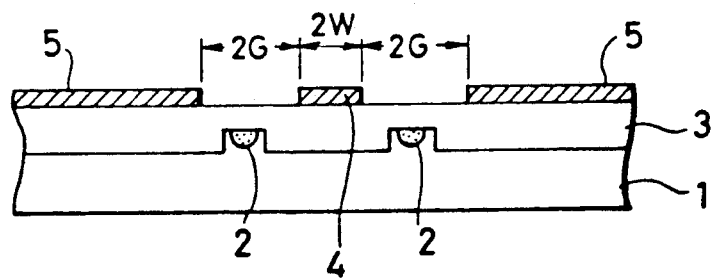
FIG. 23B is a fragmentary cross-sectional view taken along the line A—A' of FIG. 23A.
Figure 24:
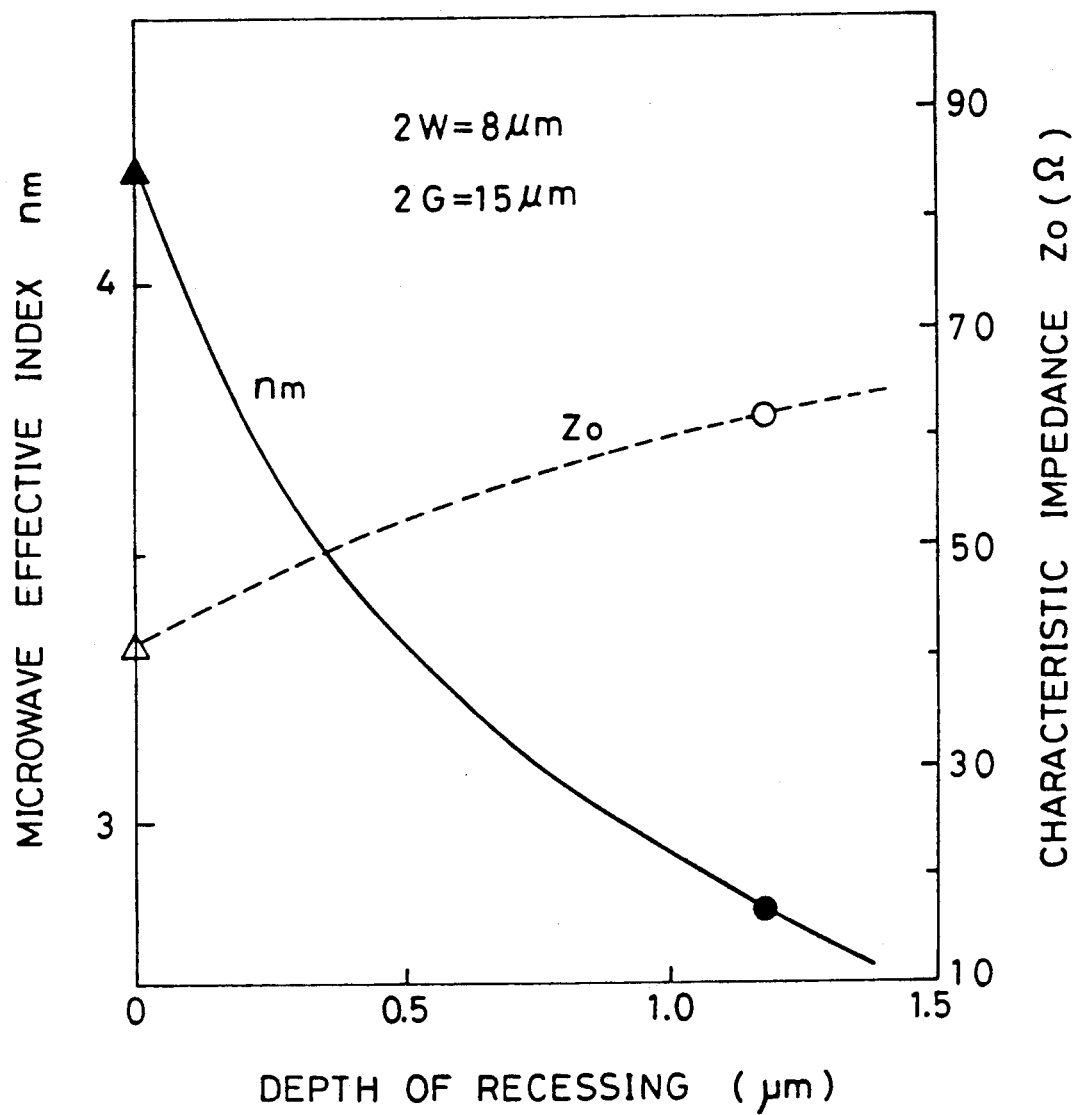
FIG. 24 is an illustration showing the relation of the depth of recessing with respect to the microwave effective index and the characteristic impedance.
Figure 25:
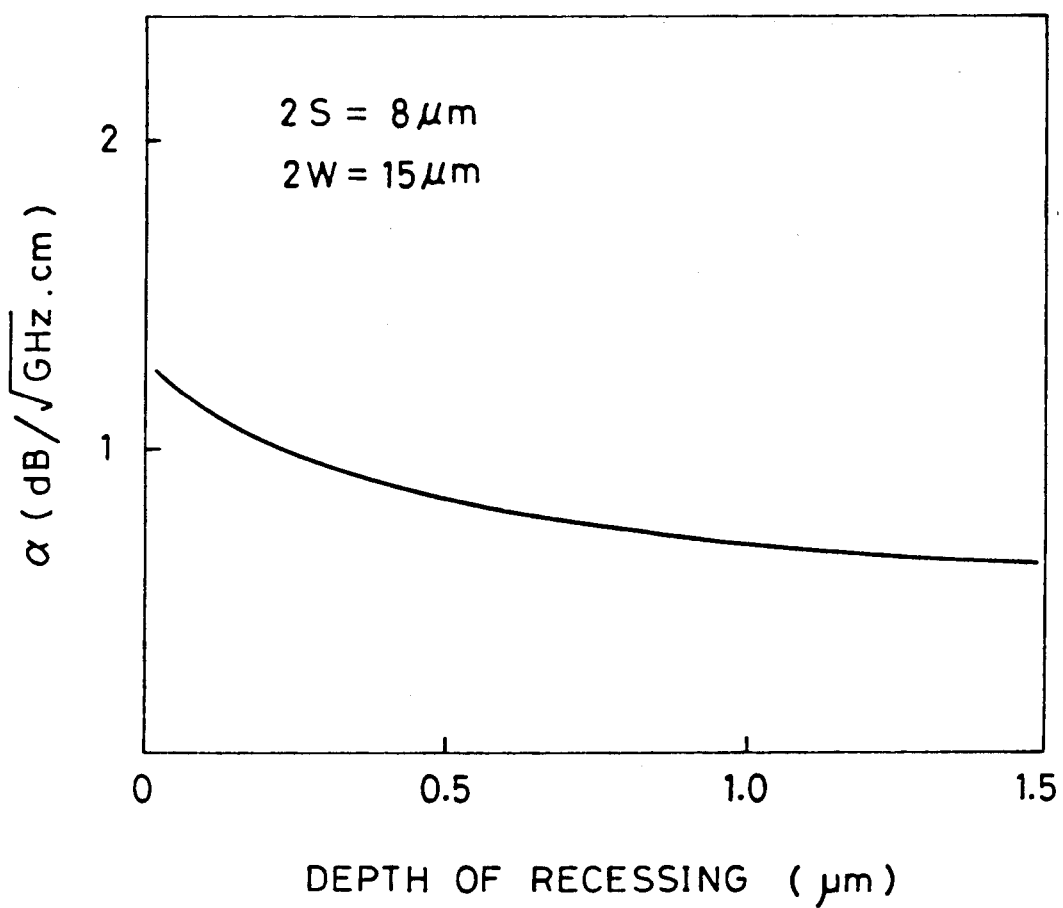
FIG. 25 is an illustration showing the relation between the depth of recessing and the microwave conductor loss α.
Figure 26:
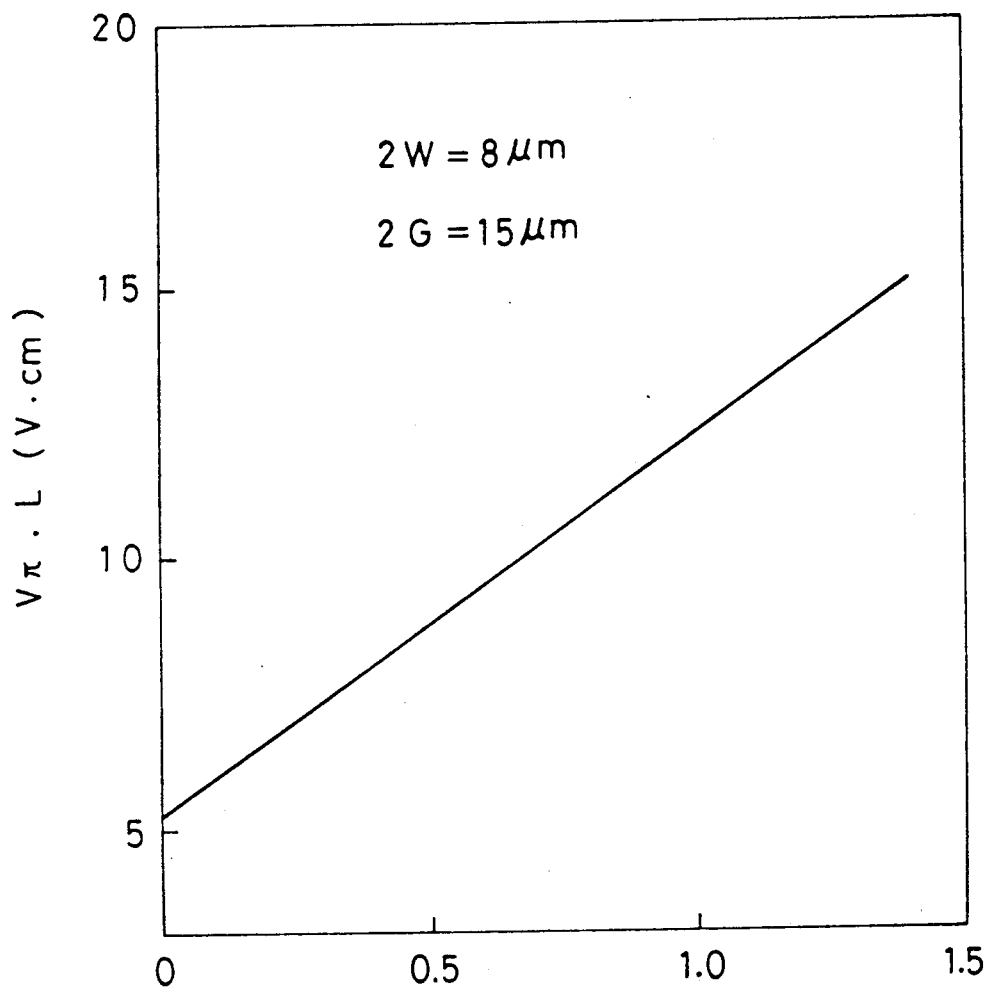
FIG. 26 is an illustration showing the relation between the thickness of that portion of the buffer layer 5 just above an optical waveguide and the product (Vπ·L) of the half-wave voltage Vπ and the interacting length L.

FIGS. 23A and 23B show a third embodiment of the present invention in which an X-cut $LiNbO_3$ substrate 1 is used. In this embodiment, a thick buffer layer 3 having a low dielectric constant is disposed beneath electrodes 4 and 5, and the edges of the electrodes, which generate lines of strong electric forces, are spaced apart considerably from the substrate 1. Therefore, the effect of reducing the dielectric constant is excellent. For producing this structure, optical waveguides 2 are formed in the substrate 1 by an ordinary Ti thermal diffusion method. Then, while leaving those sections of the surface portion of the substrate 1 that include the optical waveguides 2, part or the whole of the remainder of the surface portion is removed by etching, so that the surface of the substrate is recessed except for protruding portions that include the optical waveguides therein. FIG. 24 shows the relation of the depth of the recessing of the substrate 1 to the microwave effective index and the characteristic impedance. It can be seen from FIG. 24 that as the depth of the recessing increases, the microwave effective index decreases. FIG. 25 shows the relation between the depth of the recessing and the microwave conductor loss α. It can be seen from FIG. 25 that as the depth of the recessing increases, the microwave conductor loss decreases. FIG. 26 shows the relation between the thickness of those portions of the buffer layer 3 disposed just above the optical waveguides 2 and Vπ·L (Vπ: half-wave voltage; L: interacting length). In the present invention, since the thickness of those portions of the buffer layer 3 above the optical waveguides 2 is small, the driving voltage can be kept to a low level.

In other words, in this embodiment, not only can the effective index of the microwave and the microwave conductor loss be reduced by using a thick buffer layer, but also the driving voltage can be limited by using a thin buffer layer.

Fourth Embodiment

Figure 27A:
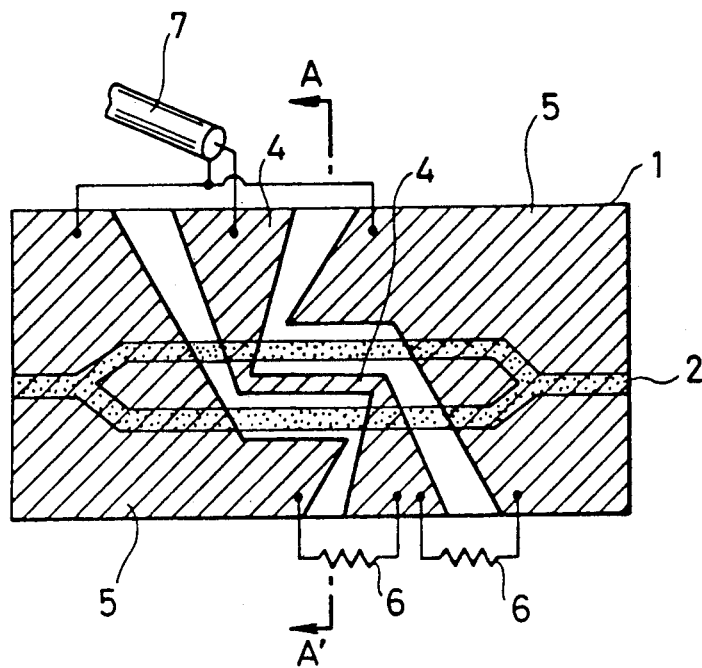
FIG. 27A is a plan view of a fourth embodiment of the present invention.
Figure 27B:
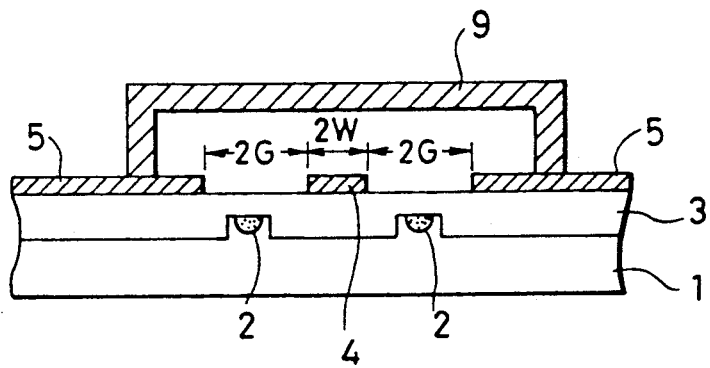
FIG. 27B is a fragmentary cross-sectional view taken along the line A—A' of FIG. 27A.

FIGS. 27A and 27B show a fourth embodiment of the present invention, which differs from the third embodiment of FIG. 23 in that a shield conductor 9 is additionally provided, so that even if the depth of the recessing is small, complete matching between the effective refractive indexes of the microwave and the light can be achieved. In this embodiment, since the driving voltage is as low as that in the third embodiment, the interacting length L required to obtain the desired driving voltage can be short. Therefore, the band of the light modulation can be correspondingly widened.

Fifth Embodiment

Figure 28A:
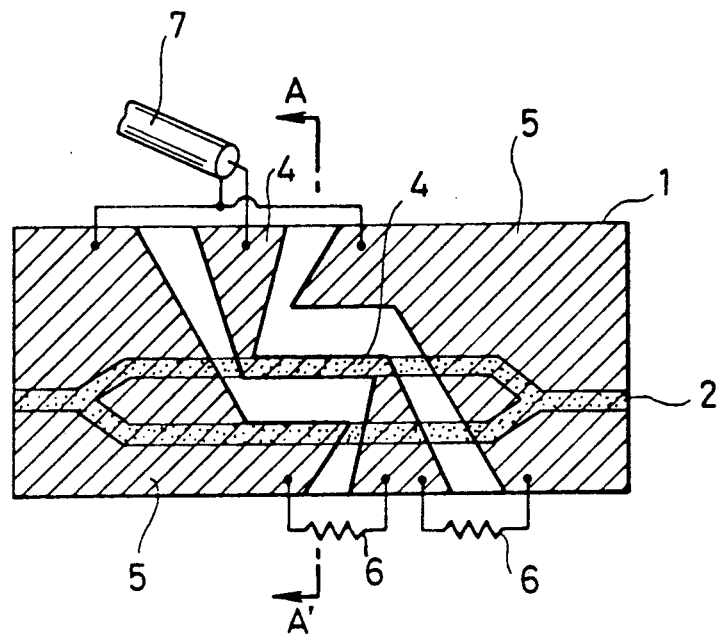
FIG. 28A is a plan view of a fifth embodiment of the present invention.
Figure 28B:
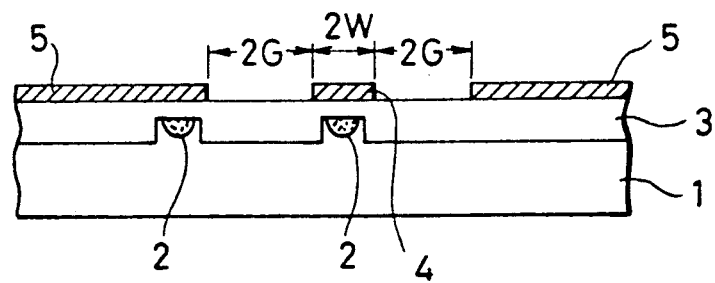
FIG. 28B is a fragmentary cross-sectional view taken along the line A—A' of FIG. 28A.

FIGS. 28A and 28B show a fifth embodiment of the present invention in which a Z-cut $LiNbO_3$ substrate 1 is used. The principle of the widening of the band will be described with respect to the center electrode 4. In the vicinity of the electrodes, that is, at the thin regions of buffer layer 3, the electric field intensity Ey in the direction of the depth is not constant across the width 2W of the center electrode 4, and becomes abruptly strong near the edges of the electrodes. Therefore, if there exists a thick buffer layer at the region where the electric field intensity Ey in the direction of the depth is strong, this will provide the effect of reducing the microwave effective index. In practice, if the width 2W of the center electrode 4 is made generally equal to or slightly greater than the width of the protruding portion of the substrate where the optical waveguide is provided s that the abrupt electric field in the vicinity of the edge of the electrode can perceive the thicker portion of the buffer layer, the microwave effective index is reduced.

Sixth Embodiment

Figure 29A:
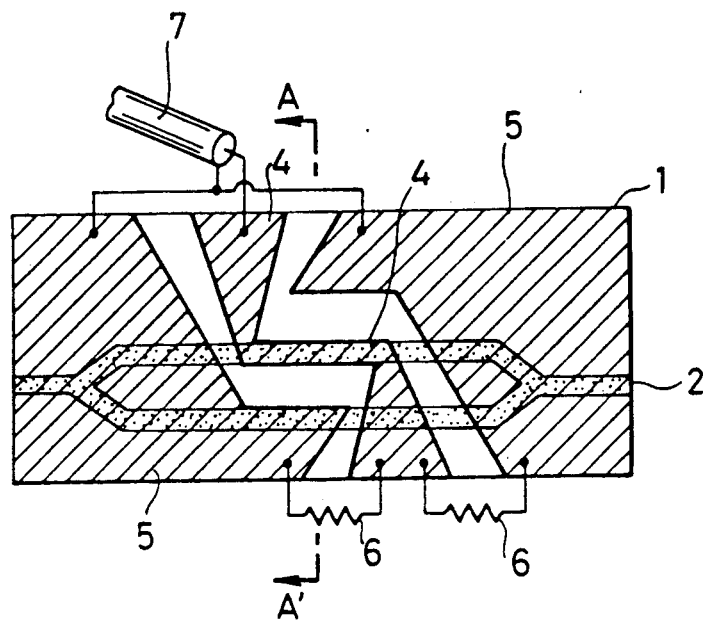
FIG. 29A is a plan view of a sixth embodiment of the present invention.
Figure 29B:
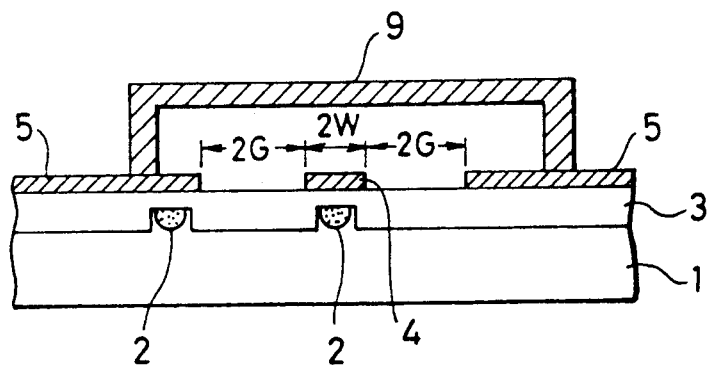
FIG. 29B is a fragmentary cross-sectional view taken along the line A—A' of FIG. 29A.

FIGS. 29A and 29B show a sixth embodiment of the present invention, which differs from the fifth embodiment of FIG. 28 in that a shield conductor 9 is additionally provided, so that even if the depth of the recessing is small, a complete matching between the effective refractive indexes of the microwave and the light can be achieved. In this embodiment, since the driving voltage is as low as that in the fifth embodiment, the interacting length L required to obtain the desired driving voltage can be short. Therefore, the band of the light modulation can be correspondingly widened.

In the above embodiments, although Mach-Zehnder optical waveguides are used as the optical waveguides, a phase modulator can be provided if only the optical waveguide disposed beneath the center electrode is used in the third and fourth embodiments, or if only one of the optical waveguides is used in the fifth and sixth embodiments.

In the above embodiments, although the electrodes are constituted by a coplanar waveguide, any other suitable electrode structure such as an asymmetrical coplanar strip may be used. Also, the substrate may be a Y-cut substrate of $LiNbO_3$ or any other suitable substrate insofar as they have electro-optic effects. Further, since the shield conductor is only required to serve as an electric wall, the shield conductor is not necessarily grounded to the earth electrode, and may be supported through a spacer.

Seventh Embodiment

Figure 30A:
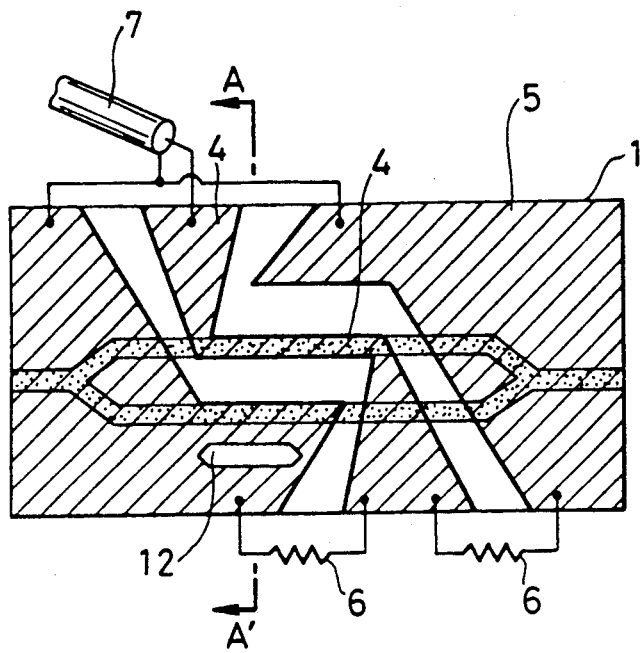
FIG. 30A is a plan view of a seventh embodiment of the present invention.
Figure 30B:
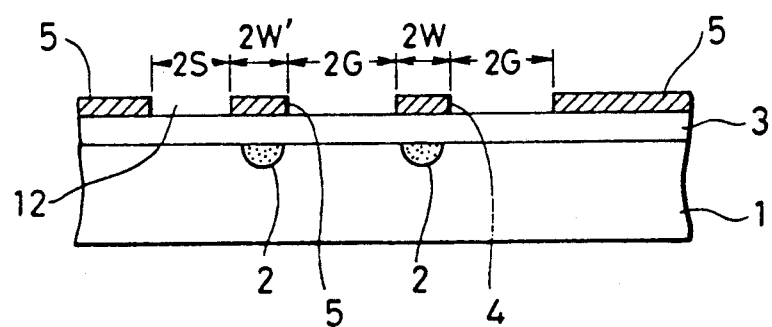
FIG. 30B is a fragmentary cross-sectional view taken along the line A—A' of FIG. 30A.

FIGS. 30A and 30B show the present invention embodied in a Mach-Zehnder light intensity modulator using a Z-cut substrate 1 of $LiNbO_3$. In this seventh embodiment, a slot 12 is formed through an earth electrode 5.

Figure 31:
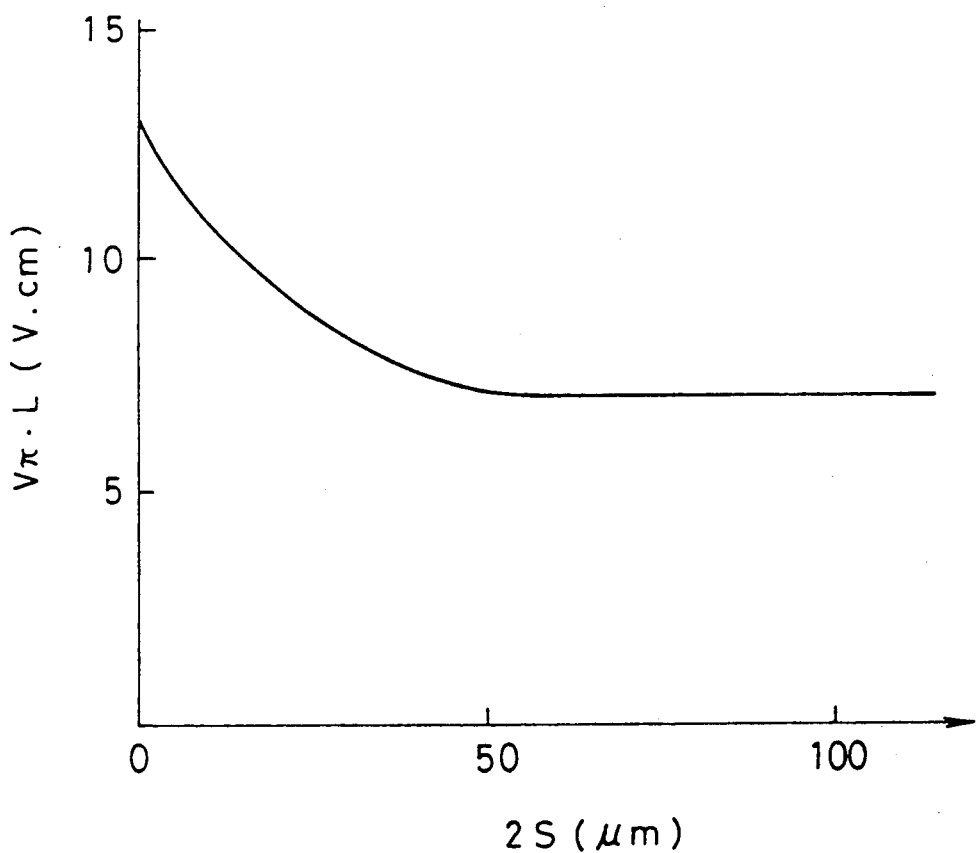
FIG. 31 is an illustration explanatory of the operation of the seventh embodiment.

The width of a narrow conductor portion of the earth electrode is designated by 2W'. The center electrode 4 has a width 2W of 8 μm, the gap 2G between the center electrode 4 and the earth electrode 5 is 15 μm, and the buffer layer 3 of $SiO_2$ has a thickness of 1.2 μm. FIG. 31 shows the value of the product (Vπ·L) of the half-wave voltage Vπ and the interacting length L when 2W' is 8 μm and the width 2S of the slot 12 is a variable. As can be seen from FIG. 31, as the width 2S of the slot 12 increases, the value of the product (Vπ·L) decreases. The reason for this is that the lines of electric force generated from the center electrode 4 concentrate on the narrow conductor portion (having the width 2W') of the earth electrode 5. Therefore, the driving voltage can be reduced, and the interacting length required for obtaining the desired driving voltage can be shortened. As a result, the band can be greatly widened.

Eighth Embodiment

Figure 32A:
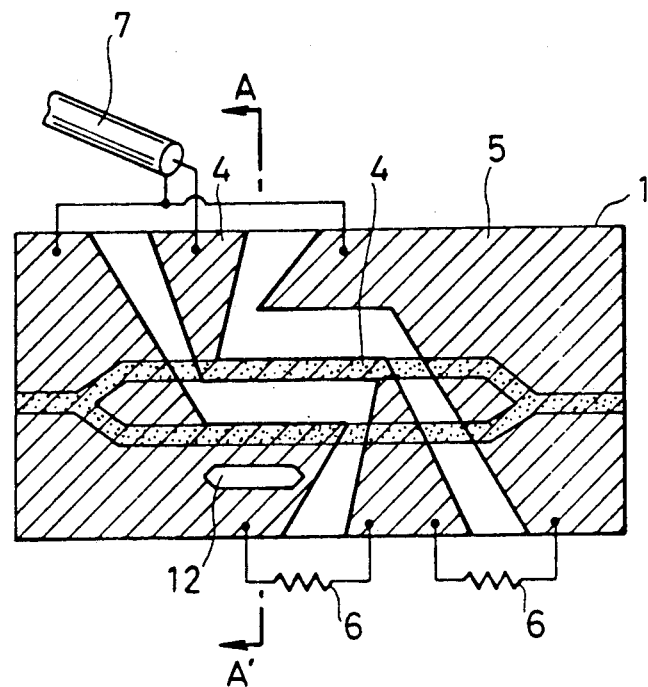
FIG. 32A is a plan view of an eighth embodiment of the present invention.
Figure 32B:
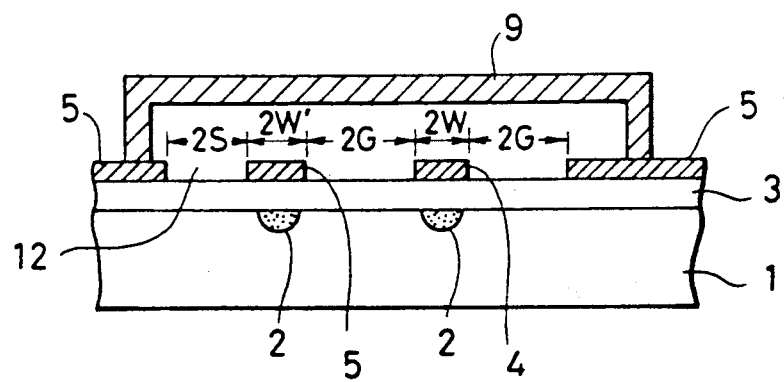
FIG. 32B is a fragmentary cross-sectional view taken along the line A—A' of FIG. 32A.

FIGS. 32A and 32B show an eighth embodiment of the present invention, which differs from the seventh embodiment of FIG. 30 in that a shield conductor 9 is additionally provided, so that the effective refractive indexes of the microwave and the light can coincide with each other, thereby achieving light modulation over quite a wide band.

In the seventh and eighth embodiments, although a Z-cut substrate 1 is used, an X-cut substrate can be used instead, in which case another identical slot would also be formed through the other earth electrode, and the two optical waveguides would be disposed near the centerlines of the gaps on the opposite sides of the center electrode.

Ninth Embodiment

Figure 33A:
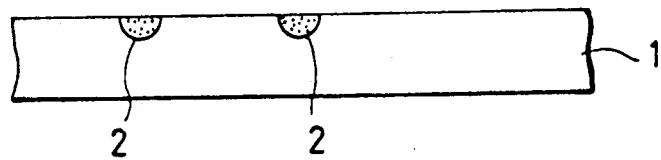
FIGS. 33A to 33C are views showing the steps of producing an electrically controlled optical device according to a ninth embodiment of the present invention.
Figure 33B:
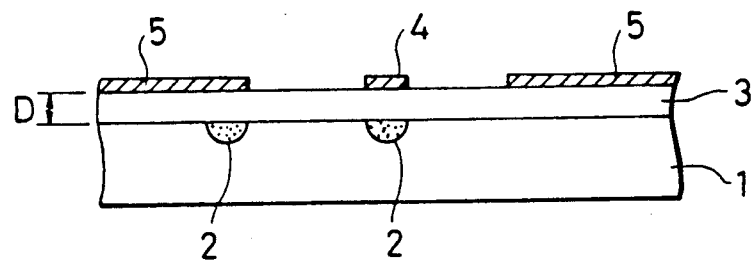
Figure 33C:
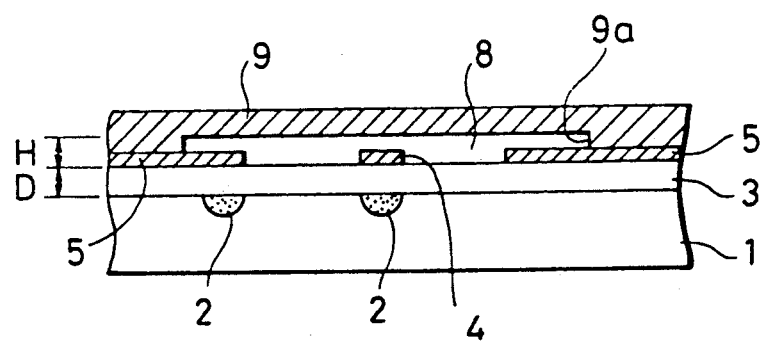

FIGS. 33A-33C show the steps for producing an electrically controlled optical device according to the present invention. In FIG. 33A, optical waveguides 2 are formed at the surface of a Z-cut substrate of $LiNbO_3$, for example, by the Ti diffusion method. More specifically, patterns of Ti, for example, having a width of about 4 to about 9 μm and a length of 1 to 6 cm are formed, for example, by electron beam deposition and photolithography. Thereafter, the Ti is diffused into the substrate of $LiNbO_3$ by heat treatment to form the optical waveguides 2. Then, in FIG. 33B, using plasma CVD or the like, a $SiO_2$ layer is formed as the buffer layer 3 on the surface of the $LiNbO_3$ substrate 1 having the optical waveguides 2 therein. Then, by means of vacuum deposition or the like, plating and photolithography, the center electrode 4 and earth electrodes 5 are formed on the buffer layer 3, using, for example, gold (Au), the thickness of these electrodes being, for example, 4 to 5 μm. Then, in FIG. 33C, a preformed shield conductor 9 with a groove having a depth of 0 to about 2 μm is fixed by an adhesive, thereby completing the electrically controlled optical device.

Figure 34A:
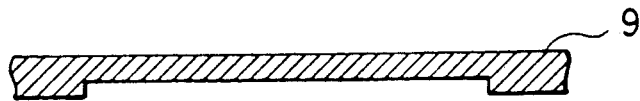
FIGS. 34A to 34C are cross-sectional views of shield conductors, respectively.
Figure 34B:
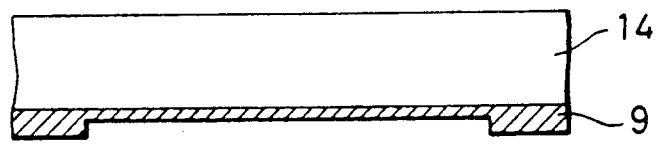
Figure 34C:
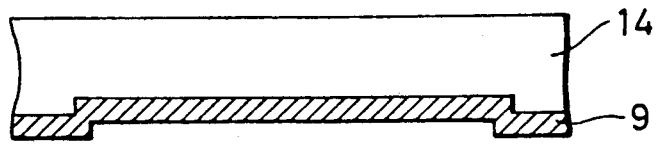

FIGS. 34A-34C show examples of the shield conductor 9 having a groove for forming an overlaid layer 8. In FIG. 34A, the groove is formed either by a wet etching technique, in which photolithography and an etchant are applied to metal, or by a dry etching technique, in which plasma or an ion beam is used. FIG. 34B shows a structure which is designed to overcome various stability and reliability problems caused by thermal stresses due to a difference in the thermal expansion coefficient between the substrate 1 and the shield conductor 9 and other factors. More specifically, using, for example, vacuum deposition and plating, a metal layer of about 10 μm thickness for constituting the conductor shield 9 is formed on a support base 14, which is the same material as the substrate 1 and has the same crystalline orientation as the substrate 1. Then, the groove is formed in the metal layer according to the same procedure as in FIG. 34A. In FIG. 34C, before a shield conductor 9 is formed, a groove is formed in the support base 14 either by a wet etching technique, in which photolithography and an etchant are used, or by a dry etching technique, in which plasma or an ion beam is used.

Figure 35:
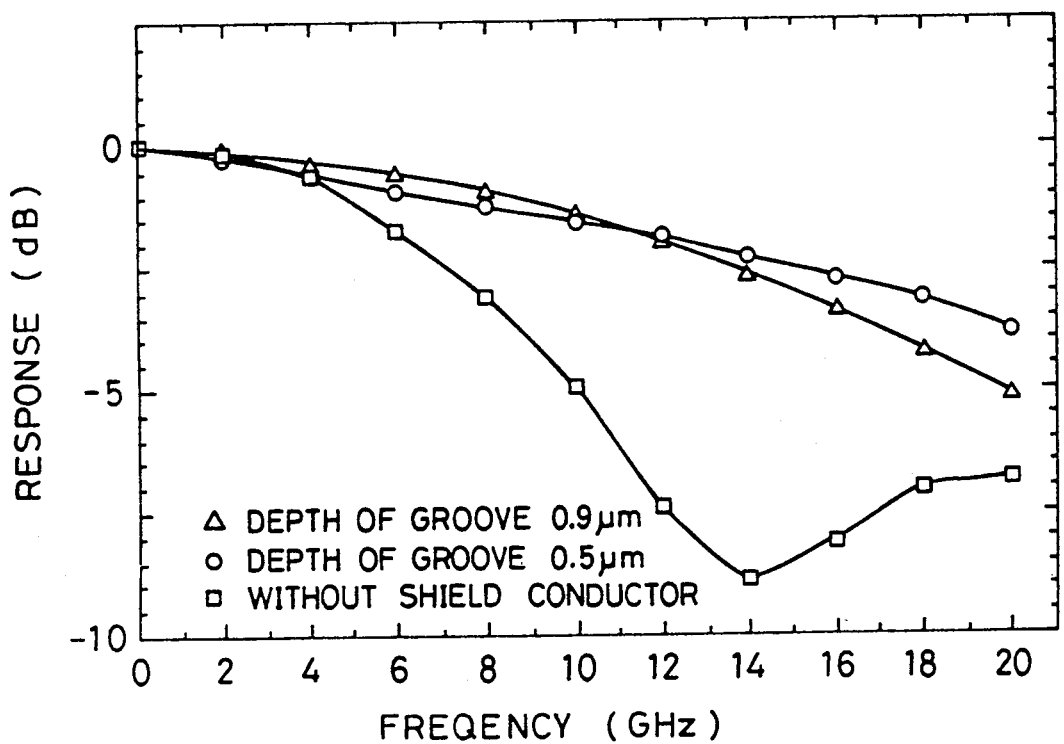
FIG. 35 is an illustration showing light-frequency response characteristics of the electrically controlled optical device of the ninth embodiment.

FIG. 35 shows the light-frequency response characteristics of a light intensity modulator produced according to the same procedure described in FIGS. 33 and 34B. More specifically, this light intensity modulator was prepared according to the following procedure. Optical waveguides 2 were formed in a substrate 1 of LiNbO$_3$ by the Ti diffusion method. Then, a buffer layer 3 of SiO$_2$ having a thickness of 1.2 μm was formed on the substrate 1, and then a traveling wave electrode structure having a thickness of about 4.5 μm and having a center electrode 4 and earth electrodes 5 was formed on the buffer layer 3. The width 2W of the center electrode 4 was 8 μm, and the gap 2G was 15 μm. Then, a conductor layer of gold was formed on a support base 14 of LiNbO$_3$ by an electron beam deposition method and plating. Then, a groove was precisely formed in the conductor layer by photolithography and the ion beam method to form the shield conductor 9. Then, the shield conductor 9 was fixed by an adhesive so as to cover the center electrode 4 and the earth electrodes 5. In FIG. 35, square marks indicate the light-frequency response characteristics before the shield conductor was attached, and the 3 dB band was about 8 GHz. O marks indicate the light-frequency response characteristics of the light modulator when the depth of the groove in the shield conductor was 0.5 μm, and the 3 dB band was about 18 GHz. Δ marks indicates the light-frequency response characteristics of the light modulator when the depth of the groove in the shield conductor was 0.9 μm, and the 3 dB band was about 15 GHz. Thus, the effects of widening the band are clear.

Tenth Embodiment

Figure 36A:
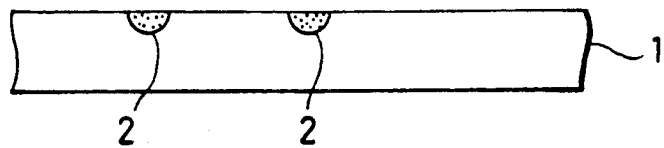
FIGS. 36A to 36D are views showing the steps of producing an electrically controlled optical device according to a tenth embodiment of the present invention.
Figure 36B:
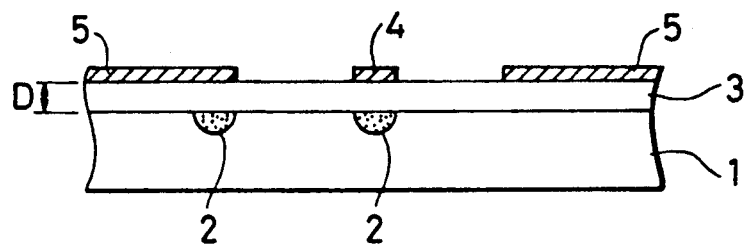
Figure 36C:
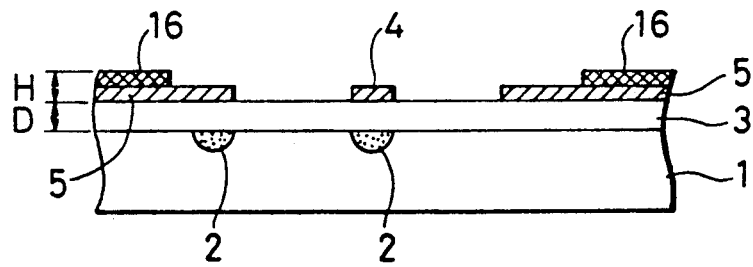
Figure 36D:
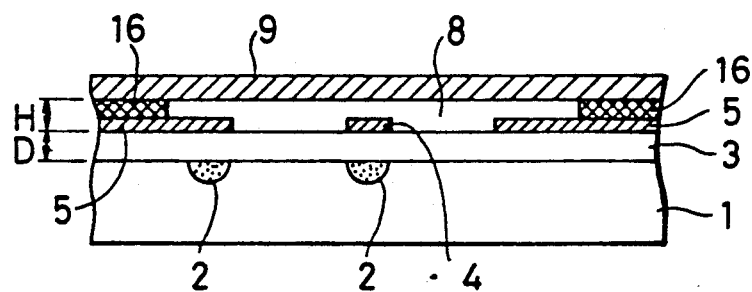

FIGS. 36A-36D show a further modified embodiment. In FIGS. 36A and 36B, according to the same procedure as in the ninth embodiment, optical waveguides 2, a buffer layer 3 and traveling wave electrodes 4 and 5 were sequentially formed on a substrate 1 of LiNbO$_3$. Then, as shown in FIG. 36C, spacers 16 of a predetermined height for controlling the thickness of an overlaid layer 8 were formed on the electrodes 5 by photolithography and plating. Then, in FIG. 36D, a shield conductor 9, for example, similar to that shown in FIGS. 34A and 34B but having no groove, was fixed, thereby completing an electrically controlled optical device.

The invention has been described in detail with respect to the preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An electrically controlled optical device, comprising: a substrate having electro-optic effects and having at least one optical waveguide;
   a buffer layer provided on said substrate;
   a traveling wave electrode structure provided on said buffer layer and comprising a center electrode and earth electrodes; and
   a shield conductor provided near to a region where said optical waveguide interacts with said traveling wave electrode structure, said shield conductor facing said traveling wave electrode structure through an overlaid layer;
   the thickness of said buffer layer and the thickness of said overlaid layer being determined so that the microwave effective refractive index of said substrate with respect to a modulating microwave signal applied to said traveling wave electrode structure approaches the effective refractive index of said optical waveguide with respect to light transmitted through said optical waveguide, and also so that the characteristic impedance of said traveling wave electrode structure approaches the characteristic impedance of an associate external microwave circuit.

2. An electrically controlled optical device according to claim 1, wherein said buffer layer is composed of a film of a polytetrafluoroethylene-type resin having a low dielectric constant.

3. An electrically controlled optical device according to claim 1, wherein a slot is formed through at least one of said earth electrodes.

4. An electrically controlled optical device, comprising;
   a substrate having at least one optical waveguide;
   a buffer layer formed on said substrate; and
   a traveling wave electrode structure comprising a center electrode and earth electrodes;
   at least those portions of said substrate disposed close to said electrodes being recessed, and said traveling wave electrode structure being disposed out of contact with said substrate at a region where light and a microwave interact with each other, so that the microwave conductor loss is reduced, so that the effective refractive index encountered by the microwave transmitted through said traveling wave electrode structure is reduced to approach the effective refractive index encountered by the light transmitted through said optical waveguide, and so that the characteristic impedance of said traveling wave electrode structure approaches the characteristic impedance of an associated external circuit.

5. An electrically controlled optical device according to claim 4, wherein said buffer layer is composed of a film of a polytetrafluoroethylene-type resin having a low dielectric constant.

6. An electrically controlled optical device according to claim 4, wherein a slot is formed through at least one of said earth electrodes.

7. An electrically controlled optical device according to claim 6, wherein a shield conductor is provided near to a region where said optical waveguide interacts with said traveling wave electrode structure, said shield conductor facing said traveling wave electrode structure through an overlaid layer.

8. An electrically controlled optical device according to claim 4, wherein a shield conductor is provided near to a region where said optical waveguide interacts with said traveling wave electrode structure, said shield conductor facing said traveling wave electrode structure through an overlaid layer.

9. An electrically controlled optical device according to claim 8, wherein said optical waveguide is disposed beneath said center electrode through said buffer layer, the width of said center electrode being at least generally equal to the width of a protruding portion of said substrate which includes said optical waveguide therein, said protruding portion being raised with respect to said recessed portion of said substrate.

10. An electrically controlled optical device according to claim 9, wherein said width of said center electrode is slightly greater than said width of said protruding portion of said substrate.

11. An electrically controlled optical device according to claim 8, wherein said optical waveguide is disposed generally midway between said center electrode and one of said earth electrodes.

12. An electrically controlled optical device according to claim 4, wherein said optical waveguide is disposed beneath said center electrode through said buffer layer, the width of said center electrode being at least generally equal to the width of a protruding portion of said substrate which includes said optical waveguide therein, said protruding portion being raised with respect to said recessed portions of said substrate.

13. An electrically controlled optical device according to claim 12, wherein said width of said center electrode is slightly greater than said width of said protruding portion of said substrate.

14. An electrically controlled optical device according to claim 4, wherein said optical waveguide is disposed generally midway between said center electrode and one of said earth electrodes.

15. An electrically controlled optical device, comprising:
a substrate of electro-optical material, the substrate having an upper surface with first, second, and third recessed portions and with first and second protruding portions, the first protruding portion being disposed between the first and second recessed portions and the second protruding portion being disposed between the second and third recessed portions, the substrate additionally having a first optical waveguide in the first protruding portion and a second optical waveguide in the second protruding portion;
a buffer layer on the upper surface of the substrate, the buffer layer having a flat upper surface, the buffer layer being thicker above the recessed portions than above the protruding portions; and
a traveling wave electrode structure on the upper surface of the buffer layer.

16. The electrically controlled optical device of claim 15, further comprising a shield conductor mounted on the electrically controlled optical device, the shield conductor being disposed above the traveling wave electrode structure and extending at least between the first and second optical waveguides.

17. The electrically controlled optical device of claim 16, wherein the shield conductor is mounted on the traveling wave electrode structure.

18. The electrically controlled optical device of claim 15, wherein the traveling wave electrode structure includes an earth conductor having an edge over the first recessed portion, another earth conductor having an edge over the third recessed portion, and a center electrode between said edges of the earth conductors, the center conductor having parallel edges that are disposed over the recessed portion.

19. The electrically controlled optical device of claim 18, further comprising a shield conductor mounted on the earth electrodes and spaced apart from the center electrode.

20. The electrically controlled optical device of claim 15, wherein the traveling wave electrode structure includes an earth conductor over the first recessed portion and the first optical waveguide, another earth conductor having an edge over the third recessed portion, and a center conductor between the earth conductors and disposed over the second optical waveguide.

21. The electrically controlled optical device of claim 20, wherein the earth electrode over the first recessed portion and the first optical waveguide has an elongated slot that is adjacent the first optical waveguide and parallel to the first optical waveguide.

22. The electrically controlled optical device of claim 24, further comprising a shield electrode mounted on the earth electrodes and spaced apart from the center electrode.

23. The electrically controlled optical device of claim 22, wherein the center conductor has a width that is approximately the same as the width of the second optical waveguide.

24. The electrically controlled optical device of claim 22, further comprising a shield conductor mounted on the earth electrodes and spaced apart from the center electrode.

25. An electrically controlled optical device, comprising:
a substrate of electro-optical material, the substrate having first and second parallel optical wavelengths therein;
a buffer layer on the substrate; and
a traveling wave electrode structure on the buffer layer, the traveling wave electrode structure including
an earth electrode having a portion which extends over the first optical waveguide, the earth electrode additionally having an elongated slot adjacent the first optical waveguide and parallel to the first optical wave guide,
another earth electrode; and
a center electrode between the earth electrodes, the center electrode being disposed above the second optical waveguide.

* * * * *

UNITED STATES PATENT AND TRADEMARK OFFICE
CERTIFICATE OF CORRECTION

PATENT NO. : 5,129,017
DATED : July 7, 1992
INVENTOR(S) : Kenji Kawano et al

It is certified that error appears in the above-identified patent and that said Letters Patent is hereby corrected as shown below:

On title page, item [73]
   the assignee's name should read --Nippon Telegraph and Telephone Corporation--.

Signed and Sealed this

Fourteenth Day of September, 1993

Attest:

BRUCE LEHMAN

Attesting Officer

Commissioner of Patents and Trademarks